United States Patent
Bae et al.

(10) Patent No.: US 11,539,068 B2
(45) Date of Patent: Dec. 27, 2022

(54) METHOD FOR MANUFACTURING SECONDARY BATTERY

(71) Applicant: LG CHEM, LTD., Seoul (KR)

(72) Inventors: Dong Hun Bae, Daejeon (KR); Hyo Jin Park, Daejeon (KR); Suk Hyun Hong, Daejeon (KR); Joon Sung Bae, Daejeon (KR); Beom Koon Lee, Daejeon (KR); Dae Bong Lim, Daejeon (KR); Jin Woo Heo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 29 days.

(21) Appl. No.: 16/764,625

(22) PCT Filed: Dec. 7, 2018

(86) PCT No.: PCT/KR2018/015578
§ 371 (c)(1),
(2) Date: May 15, 2020

(87) PCT Pub. No.: WO2019/117558
PCT Pub. Date: Jun. 20, 2019

(65) Prior Publication Data
US 2020/0403263 A1    Dec. 24, 2020

(30) Foreign Application Priority Data

Dec. 15, 2017  (KR) .................. 10-2017-0173120
Dec. 15, 2017  (KR) .................. 10-2017-0173121
Nov. 26, 2018  (KR) .................. 10-2018-0147728

(51) Int. Cl.
*H01M 10/04*  (2006.01)
*H01M 50/325*  (2021.01)
(Continued)

(52) U.S. Cl.
CPC ....... *H01M 10/04* (2013.01); *H01M 10/0404* (2013.01); *H01M 10/049* (2013.01); *H01M 50/325* (2021.01)

(58) Field of Classification Search
CPC ............. H01M 50/102; H01M 50/105; H01M 50/107; H01M 50/178; H01M 50/172;
(Continued)

(56) References Cited

U.S. PATENT DOCUMENTS 6,048,638 A     4/2000   Pendalwar
8,025,999 B2    9/2011   Kim et al.
(Continued)

FOREIGN PATENT DOCUMENTS

CA    1075765 A      4/1980
JP    2010-21104 A   1/2010
(Continued)

OTHER PUBLICATIONS

International Search Report (PCT/ISA/210) iisued in PCT/KR2018/015578, dated Mar. 15, 2019.
(Continued)

*Primary Examiner* — Matthew T Martin
*Assistant Examiner* — Bartholomew A Hornsby
(74) *Attorney, Agent, or Firm* — Birch, Stewart, Kolasch & Birch, LLP

(57) ABSTRACT

The present invention is a method for manufacturing a secondary battery. An electrode assembly and an electrolyte are accommodated into a body of a battery case. The body of the battery case has an accommodation part and a gas pocket part, and a passage that extends from the accommodation part to the outside discharges an internal gas from the accommodation part through the gas pocket part. The battery case is seated in a seating step on a support block, which has an inclined part on a side surface thereof, to support the
(Continued)

battery case. The body is pressed to discharge a gas accommodated in the accommodation part through the gas pocket part in the battery case. This method allows easy discharging of internal gas while reducing discharge of the electrolyte with the gas.

12 Claims, 23 Drawing Sheets

(58) Field of Classification Search
CPC ............ H01M 50/183; H01M 50/186; H01M 50/184; H01M 50/188; H01M 50/202; H01M 50/211; H01M 50/531; H01M 50/533; H01M 50/534; H01M 50/536; H01M 50/543; H01M 50/545; H01M 50/547; H01M 50/548; H01M 50/552; H01M 50/553
See application file for complete search history.

(56) References Cited

U.S. PATENT DOCUMENTS

| | | |
|---|---|---|
| 2007/0154803 A1 | 7/2007 | Kim et al. |
| 2013/0244093 A1* | 9/2013 | Min ..................... H01M 50/14 429/185 |
| 2014/0248519 A1 | 9/2014 | Nishikawa et al. |
| 2015/0017496 A1 | 1/2015 | Kim |

FOREIGN PATENT DOCUMENTS

| | | | |
|---|---|---|---|
| JP | 2016-9677 A | | 1/2016 |
| JP | 2017-84508 A | | 5/2017 |
| JP | 2017084508 A | * | 5/2017 |
| KR | 10-0719736 B1 | | 5/2007 |
| KR | 10-2011-0103079 A | | 9/2011 |
| KR | 10-2012-0060707 A | | 6/2012 |
| KR | 10-2013-0052064 A | | 5/2013 |
| KR | 10-1306187 B1 | | 9/2013 |
| KR | 101306187 B1 | * | 9/2013 |
| KR | 10-2014-0015647 A | | 2/2014 |
| KR | 10-1371496 B1 | | 3/2014 |
| KR | 10-2014-0068551 A | | 6/2014 |
| KR | 10-2015-0037077 A | | 4/2015 |
| KR | 10-2015-0056932 A | | 5/2015 |
| KR | 10-1517062 B1 | | 5/2015 |
| KR | 10-2015-0107102 A | | 9/2015 |
| KR | 10-2015-0107115 A | | 9/2015 |
| KR | 10-1602466 B1 | | 3/2016 |
| KR | 101602466 B1 | * | 3/2016 |
| KR | 10-1644116 B1 | | 7/2016 |
| KR | 10-2017-0087250 A | | 7/2017 |

OTHER PUBLICATIONS

Extended European Search Report for European Application No. 18888845.7, dated Nov. 24, 2020.

* cited by examiner

METHOD FOR MANUFACTURING SECONDARY BATTERY

CROSS-REFERENCE TO RELATED APPLICATION

The present application claims the benefit of the priority of Korean Patent Application Nos. 10-2017-0173120, filed on Dec. 15, 2017, 10-2017-0173121, filed on Dec. 15, 2017, and 10-2018-0147728, filed on Nov. 26, 2018, which are hereby incorporated by reference in their entirety.

TECHNICAL FIELD

The present invention relates to a method for manufacturing a secondary battery.

BACKGROUND ART

Secondary batteries are rechargeable unlike primarily batteries, and also, the possibility of compact size and high capacity is high. Thus, recently, many studies on rechargeable batteries are being carried out. As technology development and demands for mobile devices increase, the demands for rechargeable batteries as energy sources are rapidly increasing.

Rechargeable batteries are classified into coin type batteries, cylindrical type batteries, prismatic type batteries, and pouch type batteries according to a shape of a battery case. In such a secondary battery, an electrode assembly mounted in a battery case is a chargeable and dischargeable power generating device having a structure in which an electrode and a separator are stacked.

The electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

Recently, the pouch-type battery in which a stack/folding type electrode assembly is built in a pouch-type battery case provided as an aluminum lamination sheet is attracting much attention due to its low manufacturing cost, small weight, easy shape deformation, and the like, and thus, its usage is gradually increasing.

However, when the secondary battery is manufactured according to the related art, in a degassing process of discharging an internal gas of the secondary battery to the outside, since the gas is removed in a state in which the secondary battery is laid down, there has been a problem that an electrolyte accommodated in the secondary battery is discharged together with the gas.

DISCLOSURE OF THE INVENTION

Technical Problem

One aspect of the present invention is to provide a method for manufacturing a secondary battery, which is capable of easily discharging an internal gas of the secondary battery.

Another aspect of the present invention is to provide a method for manufacturing a secondary battery, which is capable of preventing an electrolyte accommodated in the secondary battery from being discharge together with an internal gas when the internal gas of the secondary battery is discharged.

Further another aspect of the present invention is to provide a method for manufacturing a secondary battery, which is capable of preventing the secondary battery from being contaminated because an electrolyte accommodated in the secondary battery is discharged together with an internal gas when the internal gas of the secondary battery is discharged.

Technical Solution

A method for manufacturing a secondary battery according to a first embodiment of the present invention comprises a formation step of accommodating an electrode assembly and an electrolyte into a body of a battery case, wherein the body of the battery case comprises an accommodation part and a gas pocket part, wherein a passage is formed in the body of the battery case that extends from the accommodation part through the gas pocket part to an outside, and wherein the passage is capable of discharging an internal gas from the accommodation part, a seating step of seating the body of the battery case on a support block, which has an inclined part on a side surface and the inclined part supports the body of the battery case, wherein the gas pocket part is bent and seated on a top surface of the support block, and a gas discharge step of pressing the body of the battery case to discharge a gas accommodated in the accommodation part into the passage and through the gas pocket part to the outside.

Also, a method for manufacturing a secondary battery according to another embodiment of the present invention comprises a formation step of accommodating an electrode assembly and an electrolyte into a body of a battery case, wherein the body of the battery comprises an accommodation part and a gas pocket part, wherein the passage in the body of the battery case that extends from the accommodation part through the gas pocket part to an outside, wherein the passage is capable of discharging an internal gas from the accommodation part, a seating step of seating the gas pocket part on a support block, which has an inclined part on a side surface thereof, to support the gas pocket part in the battery case, and a gas discharge step of pressing the body to discharge a gas accommodated in the accommodation part through the gas pocket part in the battery case, wherein, in the seating step, the gas pocket part is seated on the inclined part of the support block.

Furthermore, a method for manufacturing a secondary battery according to further another embodiment of the present invention comprises a formation step of accommodating an electrode assembly and an electrolyte into a body of a battery case, wherein the body of the battery case comprises an accommodation part and a gas pocket part, wherein a passage is formed in the body of the battery case that extends from the accommodation part through the gas pocket part to an outside, and wherein the passage is capable of discharging an internal gas from the accommodation part, a supporting step of disposing the battery case so as to be supported on a support block, and a gas discharge step of pressing the body to discharge a gas accommodated in the accommodation part through the gas pocket part in the battery case, wherein, in the supporting step, the body of the battery case is disposed on a side surface of the support block, and the gas pocket part is bent to be disposed on a top surface of the support block.

Advantageous Effects

According to the present invention, after the secondary battery is supported by the support block, the body of the battery case, in which the electrode assembly is accommodated, may be pressed to discharge the internal gas to the outside, thereby easily discharging the internal gas.

Also, the present invention, the gas pocket part into/from which the internal gas is collected and discharged may be formed in the battery case of the secondary battery and disposed on the top surface of the support block, and then, the body of the battery case may be disposed on the inclined part of the side surface of the support block of the battery case and pressed to discharge the internal gas to the outside, thereby preventing the electrolyte accommodated in the secondary battery from being discharged together with the gas.

Furthermore, according to the present invention, as the gas pocket part is disposed on the top surface of the support block and then pierced, the gas pocket part may be easily pierced to easily secure the gas discharge passage.

Also, according to the present invention, the gas pocket part into/from which the internal gas is collected and discharged may be formed in the battery case of the secondary battery and disposed on the top surface of the support block, and then, the body of the battery case may be disposed on the side surface of the support block of the battery case and pressed to discharge the internal gas to the outside, thereby preventing the secondary battery from being contaminated due to the discharge of the electrolyte accommodated in the secondary battery.

MODE FOR CARRYING OUT THE INVENTION

Figure 1:
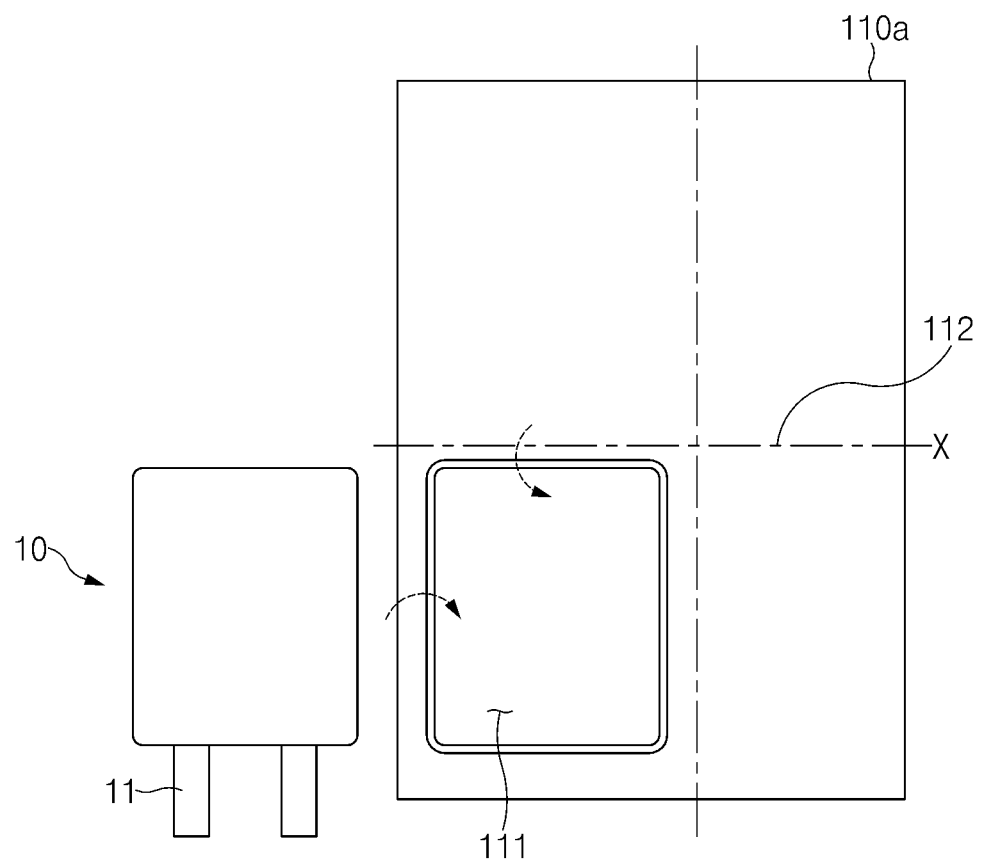
FIG. 1 is a plan view illustrating an example of a formation step in a method for manufacturing a secondary battery according to a first embodiment of the present invention.

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

Figure 2:
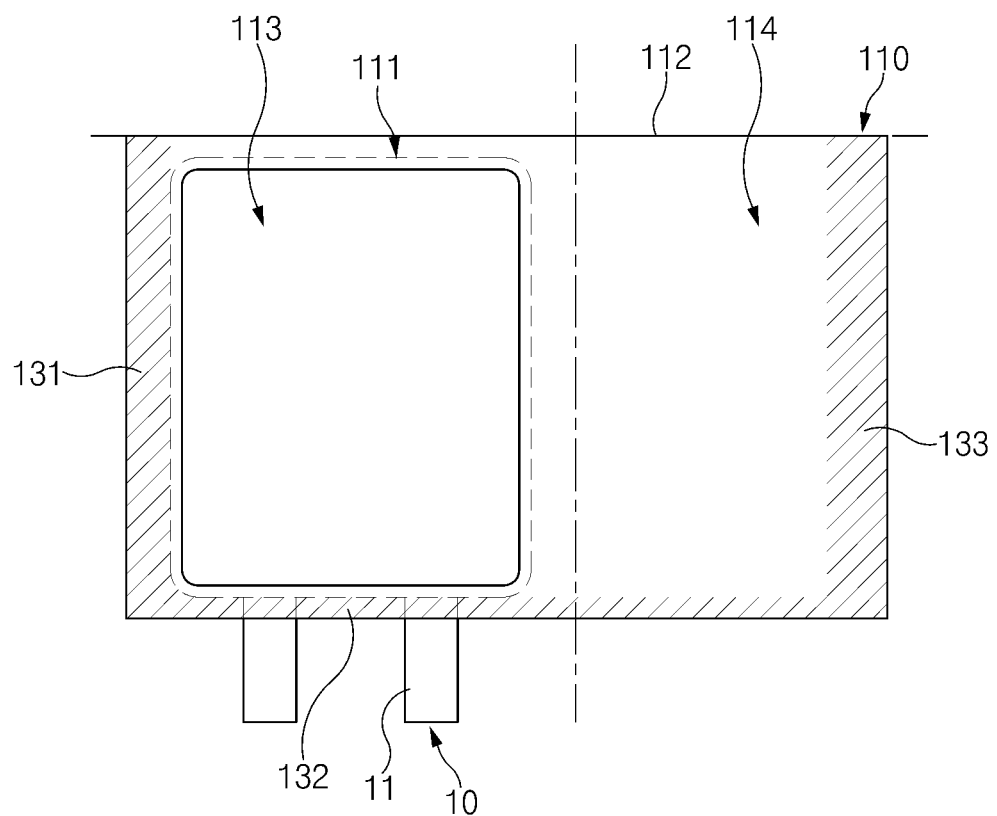
FIG. 2 is a plan view illustrating an example of a first sealing step of the formation step in the method for the secondary battery according to the first embodiment of the present invention.
Figure 3:
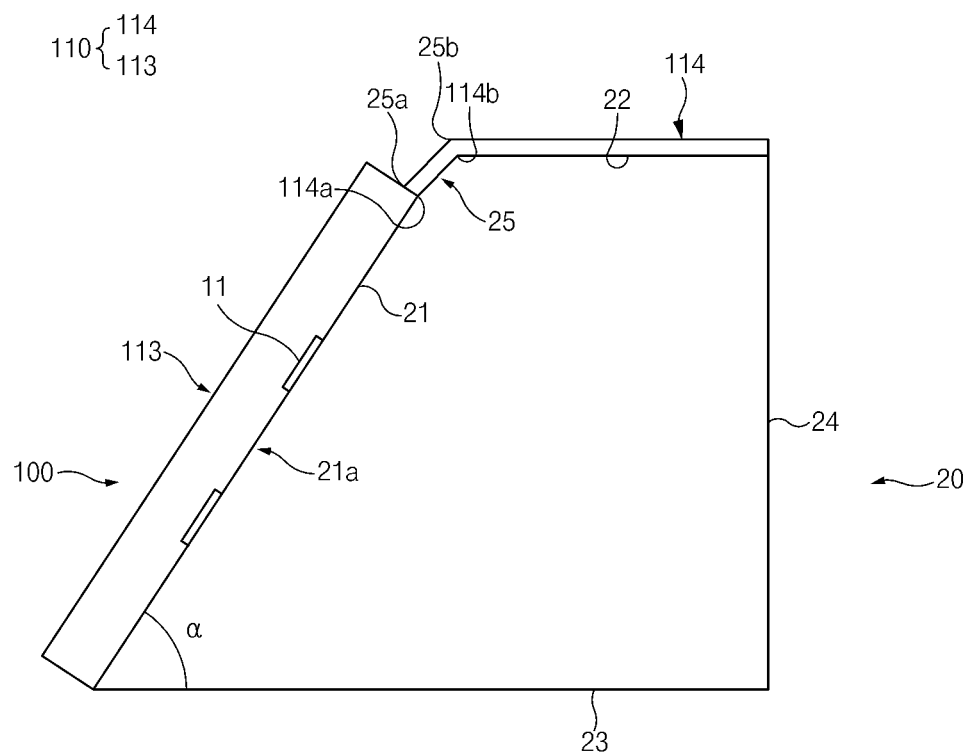
FIG. 3 is a side view illustrating an example of a seating step in the method for the secondary battery according to the first embodiment of the present invention.

FIG. 1 is a plan view illustrating an example of a formation step in a method for manufacturing a secondary battery according to a first embodiment of the present invention, FIG. 2 is a plan view illustrating an example of a first sealing step of the formation step in the method for the secondary battery according to the first embodiment of the present invention, and FIG. 3 is a side view illustrating an example of a seating step in the method for the secondary battery according to the first embodiment of the present invention.

Referring to FIGS. 1 to 3, a method for manufacturing a secondary battery according to a first embodiment of the present invention may manufacture a secondary battery 100 by comprising a formation step of forming a gas pocket part 114 in a battery case 110, a seating step of supporting the battery case 110, and a gas discharging step of pressing the battery case 110 to discharge an internal gas.

Also, the method for manufacturing the secondary battery according to the first embodiment of the present invention may further comprise an activation step of charging/discharging an electrode assembly 10 to activate the electrode assembly 10 and a second sealing step of sealing the battery case 110.

Hereinafter, the method for manufacturing the secondary battery according to the first embodiment of the present invention will be described in more detail with reference to FIGS. 1 to 7.

Referring to FIGS. 1 and 2, in the formation step, the electrode assembly 10 and an electrolyte are accommodated in the battery case 110, and a gas pocket part 114 providing a passage for discharging the internal gas is formed. Here, in the formation step, for example, the battery case 110 comprising a body 113, in which an accommodation part 111 is formed, and the gas pocket part 114, in which the passage extending from the accommodation part 111 to the outside may be formed. Here, the accommodation part 111 may accommodate the electrode assembly 10 and the electrolyte.

Also, in the formation step, a pouch sheet 110a is folded so that both surfaces thereof contact each other to form the battery case 110 comprising the accommodation part 111 and the gas pocket part 114. Here, in the formation step, a bending line 112 with respect to a virtual line X is formed on the pouch sheet 110a, and then, the pouch sheet 110a is folded along the bending line 112 to form the battery case 110. Here, in the formation step, the pouch sheet 110a has both surfaces with respect to the bending line 112 so that the opened accommodation part 111 is formed on one surface, and the other surface covers the accommodation part 111. For example, the pouch sheet 110a may comprise a base material, aluminum (Al), and a resin. Here, the base material may be, for example, a nylon material. The pouch sheet 110a may be formed by sequentially laminating a resin layer, an aluminum layer, and a nylon layer in an outward direction from the inside in which the accommodation part 111 is formed.

Also, the accommodation part 111 of the battery case 110, which is formed through the formation step, may form an accommodation space for accommodating the electrode assembly 10 and the electrolyte.

Furthermore, the gas pocket part 114 of the battery case 110, which is formed through the formation step, may collect a gas generated in the accommodation part 111 accommodating the electrode assembly 10.

In the formation step, the electrode assembly 10 in which an electrode and a separator are alternately laminated may be accommodated in the battery case 110. Here, an electrode lead 11 may be provided on the electrode assembly 10 to electrically connect the electrode assembly 10 to the outside of the battery case 110.

The formation step may further comprise a first sealing step of sealing edges 131, 132, and 133 of the battery case 110 to seal the accommodation part 111 and the gas pocket part 114. Here, in the first sealing step, the electrode assembly 10 may be accommodated in the accommodation part 111 of the battery case 110, and the remaining edges 131 and 132 of the battery case 110 except for the edge 133 disposed on an end of the gas pocket part 114 may be sealed. Then, the electrolyte may be injected into the accommodation part 111 through the end of the gas pocket part 114, and the edge 133 disposed on the end of the gas pocket part 114 may be sealed to seal the battery case 110.

Referring to FIG. 3, in the seating step, the battery case 110 may be disposed to be supported on a support block 20.

In the seating step, the body 113 of the battery case 110 may be disposed on a side surface 21 of the support block 20, and the gas pocket part 114 may be bent to be disposed on a top surface 22 of the support block 20. Here, the support block 20 may be provided with, for example, an inclined part 21a, which has the inclined side surface 21, and the horizontal top surface 22. In the seating step, the body 113 of the battery case 110 may be seated in a shape corresponding to the inclination formed on the side surface 21 of the support block 20, and the gas pocket part 113 may be seated to correspond to the horizontal top surface 22 of the support block 20. In the support block 20, for example, the top surface 22 and a bottom surface 23 may be formed as planes parallel to each other. In addition, a right surface may be perpendicular to the top surface 22 and the bottom surface 23, and a left surface may be inclined with respect to the top surface 22 and the bottom surface 23.

Also, in the seating step, the body 113 of the battery case 110 may be inclinedly disposed to be seated corresponding to the side surface 21 of the support block 20, and the gas pocket part 114 is bent to be perpendicular to the body 113 so as to be seated on the top surface 22 of the support block 20.

For example, the side surface 21 of the support block 20, on which the body 113 of the battery case 110 is seated, may be formed at an inclined angle α of 15 degrees to 75 degrees with respect to the bottom surface 23. In more detail, for example, the side surface 21 of the support block 20, on which the body 113 of the battery case 110 is seated, may be formed at an inclined angle α of 30 degrees to 60 degrees with respect to the bottom surface 23. Here, in the seating step, the body 113 of the battery case 110 may be seated to correspond to the inclination of 30 degrees to 60 degrees of the side surface 21 of the support block 20. When the internal gas is discharged from the battery case 110 in the state in which the inclined angle α of the support block 20 is greater than the angle of 30 degrees, the electrolyte may be easily prevented from flowing together with the internal gas. Furthermore, the support block 20 may have the inclined angle α less than the angle of 60 degrees to prevent the gas pocket part 114 from being excessively bent in the battery case 110, thereby allowing the internal gas to be smoothly discharged.

In the support block 20, for example, a corner portion 25 facing bent portions 114a and 114b, at which the gas pocket part 114 is bent, may be chamfered to form a plurality of bent parts 25a and 25b. Here, the plurality of bent parts 25a and 25b may be formed as two-stage bent parts 25a and 25b. In the seating step, the gas pocket part 114 may be bent in two stages in a shape corresponding to the two-stage bent parts 25a and 25b of the support block 20.

In the seating step, the gas pocket part 114 may be supported by using the support block 20 of which the top surface 22 has an inclination that gradually decreases in height toward an end of the gas pocket part 114.

In the activation step, the electrode assembly 10 may be charged and discharged to be activated. Here, in the activation step, the electrode assembly 10 may be charged and discharged before the gas discharging step so as to discharge the gas generated during the charging/discharging to the outside in the gas discharge step.

Figure 4:
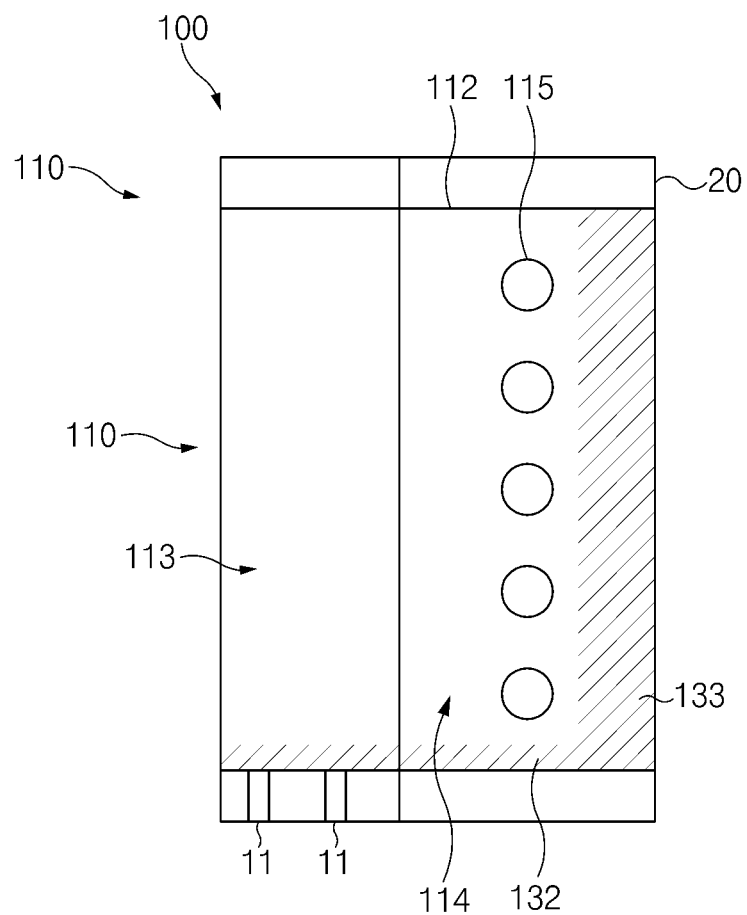
FIG. 4 is a plan view illustrating an example of a piercing step of a gas discharge step in the method for the secondary battery according to the first embodiment of the present invention.
Figure 5:
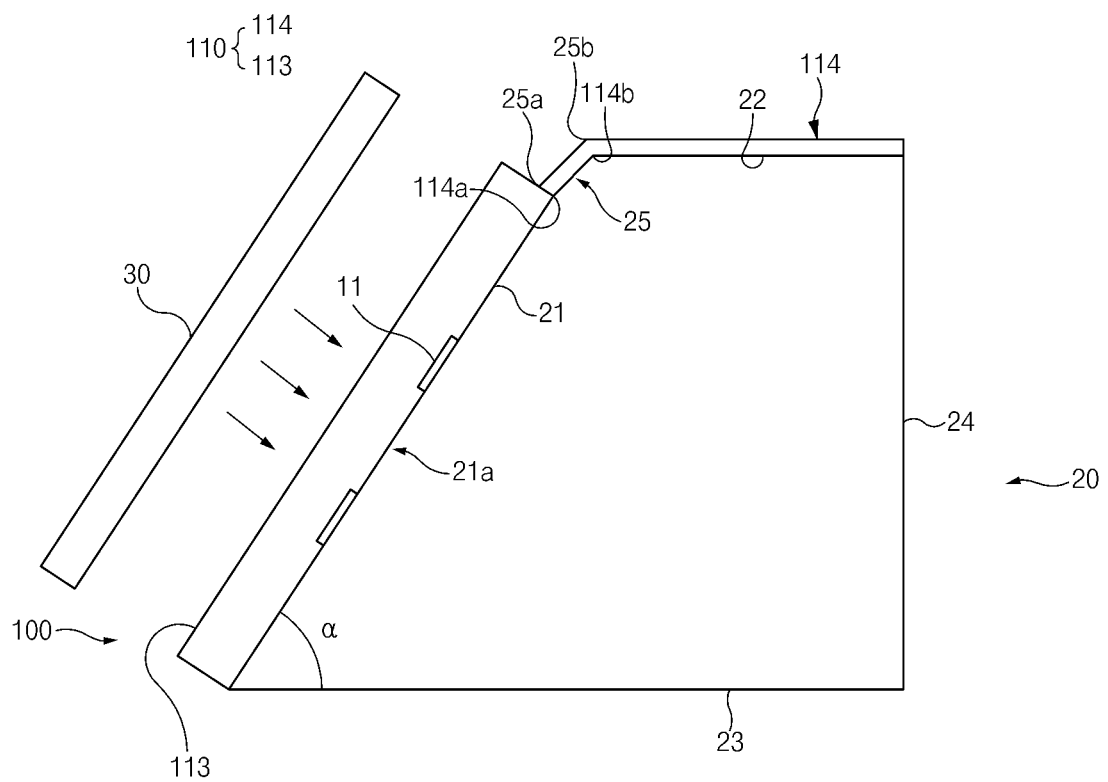
FIG. 5 is a side view illustrating an example of a pressing step of the gas discharge step in the method for the secondary battery according to the first embodiment of the present invention.

FIG. 4 is a plan view illustrating an example of a piercing step of the gas discharge step in the method for the secondary battery according to the first embodiment of the present invention, and FIG. 5 is a side view illustrating an example of a pressing step of the gas discharge step in the method for the secondary battery according to the first embodiment of the present invention.

Referring to FIGS. 4 and 5, in the gas discharge step, the body 113 of the battery case 110 may be pressed to discharge the gas accommodated in the accommodation part 111 through the gas pocket part 114.

Also, referring to FIG. 4, the gas discharge step may further comprise a piercing step of piercing the gas pocket part 114 so that the internal gas is discharged through the gas pocket part 114. Here, for example, a plurality of discharge holes 115 for discharging the gas may be formed in the gas pocket part 114. The gas pocket part 114 may be seated on the top surface 22 of the support block 20 to facilitate the formation of the discharge holes 115 through a piercing device.

Referring to FIG. 5, the gas discharge step may further comprise a pressing step of pressing the body 113 of the battery case 110 through a pusher provided as a tilt press 30. Thus, the body 113 may be pressed to easily discharge the internal gas to the discharge holes 115 of the gas pocket part 114, which are formed in the piercing step.

Here, the body 113 of the battery case 110 may be disposed on the side surface 21 of the support block 20, and the gas pocket part 114 may be disposed on the top surface 22 of the support block 20. As a result, the electrolyte is discharged together when the gas is discharged through the gas pocket part 114, the electrolyte discharged into the body 113 may not flow to prevent the secondary battery 100 from being contaminated.

Here, the tilt press 30 may have a pressing surface at an inclination corresponding to that of the body 113 of the battery case 110 seated on the inclined part 21*a* of the support block 20. Thus, the tilt press 30 may effectively press the body 113 due to the pressing surface having the inclination corresponding to that of the body 113.

In the pressing step, when the body of the battery case 110 is pressed, vacuum may be applied together to discharge the internal gas to the outside. Here, the secondary battery 100 may be disposed in a vacuum chamber (not shown), and then, the inside of the vacuum chamber may be vacuumized to apply vacuum to the secondary battery 100. Here, the support block 20 and the tilt press 30 may be accommodated into the vacuum chamber together with the secondary battery 100.

Figure 6:
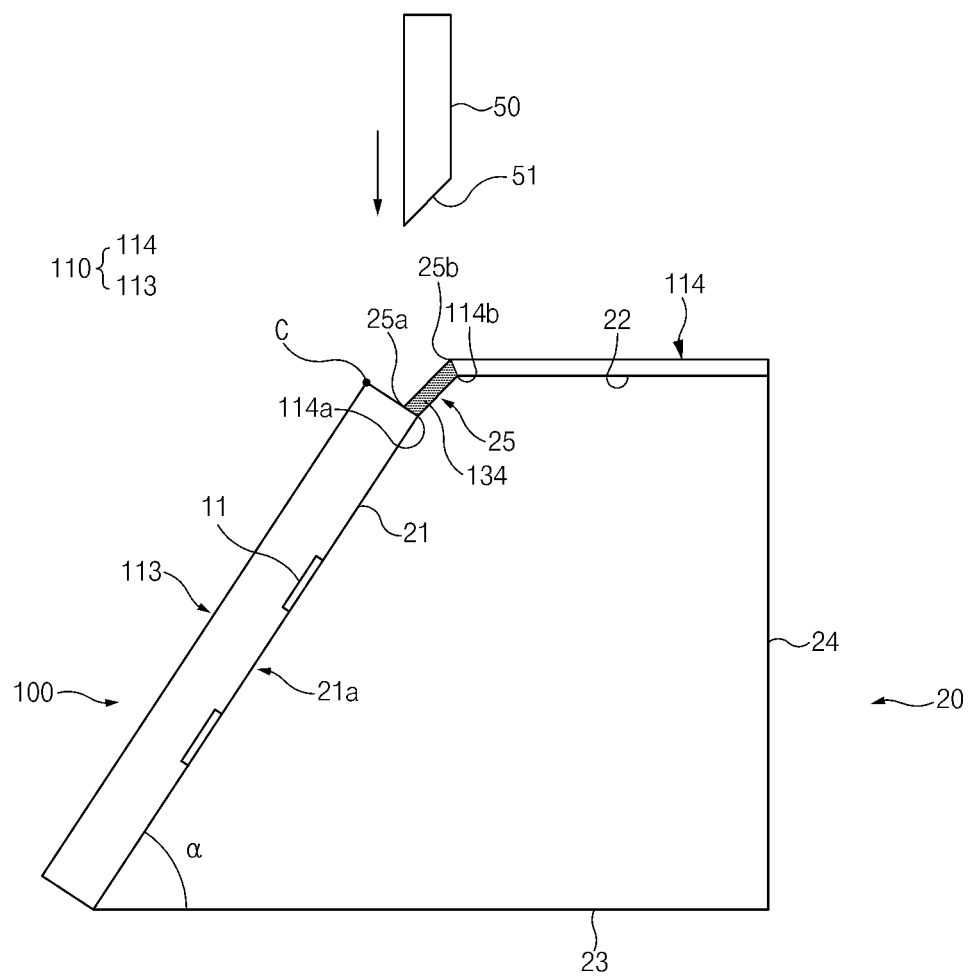
FIG. 6 is a side view illustrating an example of a second sealing step in the method for the secondary battery according to the first embodiment of the present invention.
Figure 7:
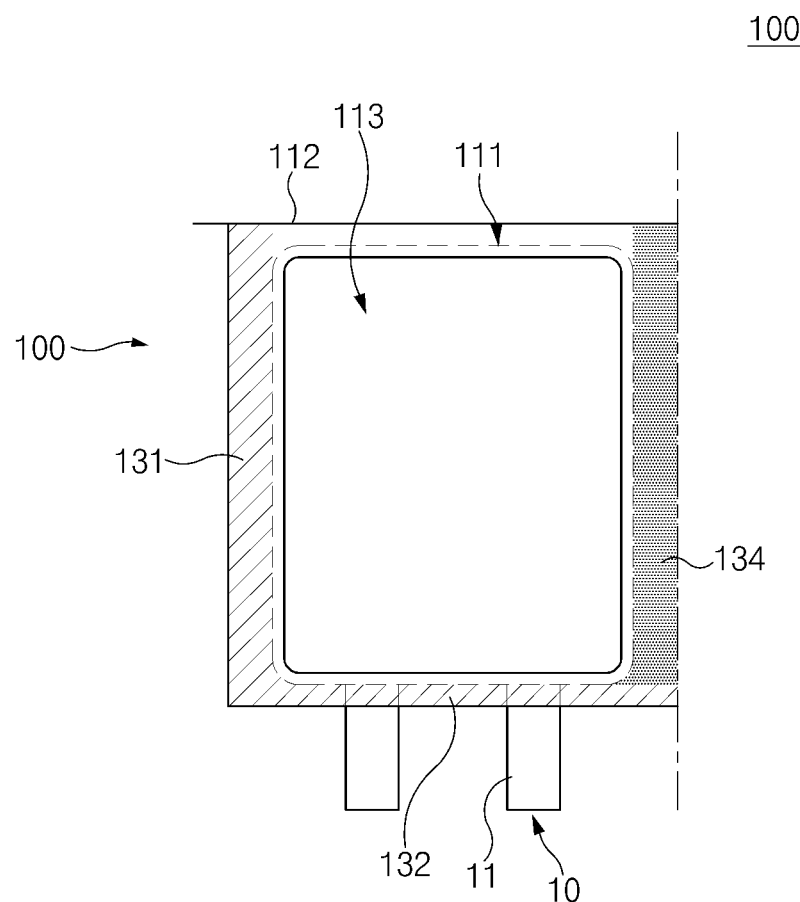
FIG. 7 is a plan view illustrating an example of a second sealing step in the method for the secondary battery according to the first embodiment of the present invention.

FIG. 6 is a side view illustrating an example of a second sealing step in the method for the secondary battery according to the first embodiment of the present invention, and FIG. 7 is a plan view illustrating an example of a second sealing step in the method for the secondary battery according to the first embodiment of the present invention.

Referring to FIGS. 6 and 7, in the second sealing step, the opened portion of the battery case 110 may be thermally fused to seal the battery case 110.

Referring to FIG. 6, in the second sealing step, a portion of the gas pocket part 114, which is adjacent to the accommodation part 111 in the battery case 110, may be thermally fused through a sealing press 50 to form the battery case 110.

Here, in the second sealing step, when the portion adjacent to the accommodation part 111 of the battery case 110 is sealed through the sealing press 50 in the horizontal direction, the portion may contact a corner C of the body 113, and thus, it may be difficult to form the sealing part 134.

As a result, in the second sealing step, a pressure may be vertically applied by using the sealing press 50 having a sealing surface 51 in a shape corresponding to the inclination of the sealing portion of the battery case 110 on an end thereof to perform the thermal fusion, thereby forming the sealing part 134. Here, in the second sealing step, heat is applied to the sealing press 50 having the sealing surface 51 in the shape corresponding to the inclined portion of the gas pocket part 114, which is adjacent to the accommodation part 111 of the battery case 110, to perform the pressing, thereby sealing the battery case 110.

Thereafter, referring to FIG. 7, in the second sealing step, the remaining portion except for the battery case 110 in the gas pocket part 114 may be cut to be removed.

Referring to FIG. 5, as described above, in the method for manufacturing the secondary battery according to the first embodiment of the present invention, when the body 113 of the battery case 110 is pressed to discharge the internal gas through the gas pocket part 114, the body 113 of the battery case 110 may be seated on the inclined part 21*a* of the support block 20, and the gas pocket part 114 may be bent to be seated on the top surface 22 of the support block 20. Then, the gas pocket part 114 may be pierced to discharge the internal gas, thereby preventing the electrolyte accommodated in the secondary battery 100 from being discharged together with the internal gas. Particularly, in the gas discharge step, even though strong pressing force is applied to the body 113 of the battery case 110, and the vacuum for degassing is strongly applied, the electrolyte accommodated in the body 113 may not be discharged.

Figure 8:
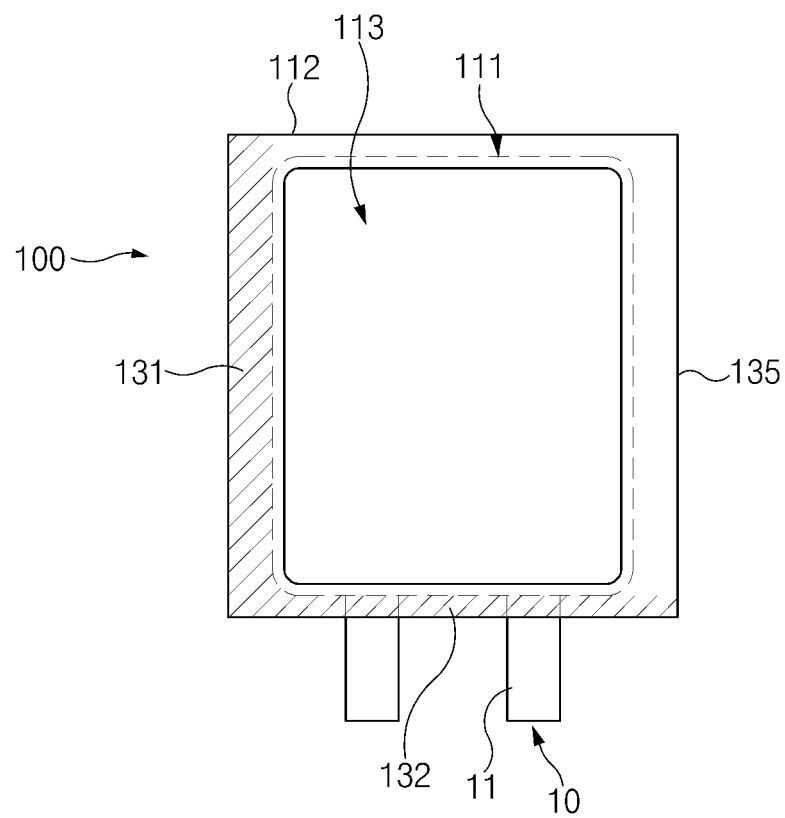
FIG. 8 is a plan view illustrating an example of a second sealing step in a method for a secondary battery according to a second embodiment of the present invention.
Figure 9:
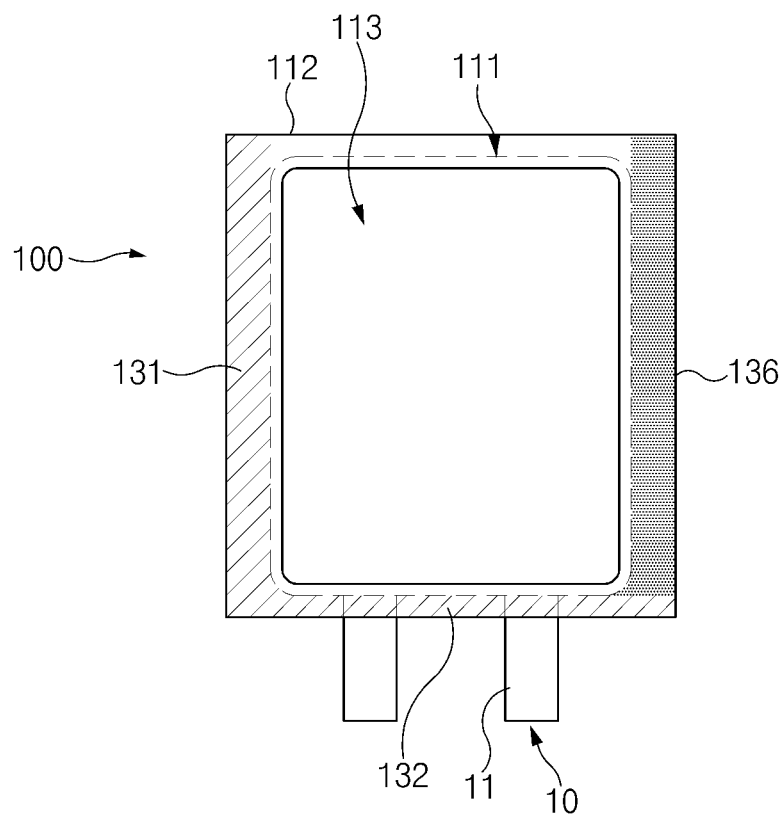
FIG. 9 is a plan view illustrating an example of the second sealing step in the method for the secondary battery according to the second embodiment of the present invention.

FIG. 8 is a plan view illustrating an example of a second sealing step in a method for a secondary battery according to a second embodiment of the present invention, and FIG. 9 is a plan view illustrating an example of the second sealing step in the method for the secondary battery according to the second embodiment of the present invention.

Referring to FIGS. 8 and 9, a method for manufacturing a secondary battery according to a second embodiment of the present invention is different from the method for manufacturing the secondary battery according to the foregoing first embodiment of the present invention in that a gas pocket part 114 is cut and then sealed in a second sealing step. Thus, contents of this embodiment, which are duplicated with those according to the first embodiment, will be briefly described, and also, differences therebetween will be mainly described.

In more detail, in the second sealing step of the method for manufacturing the secondary battery according to the second embodiment of the present invention, the gas pocket part 114 adjacent to an accommodation part 111 of a battery case 110 may be cut, and then, the cut portion 135 may be thermally fused to be sealed. Here, in the second sealing step, for example, a remaining portion of the gas pocket part 114 except for the portion adjacent to the accommodation part 111 of the gas pocket part 114 may be cut to be removed, and then, the portion of the gas pocket part 114, which adjacent to the accommodation part 111, may be thermally fused to form a sealing part 136. Thus, the accommodation part 111 of the battery case 110 may be completely sealed.

Figure 10:
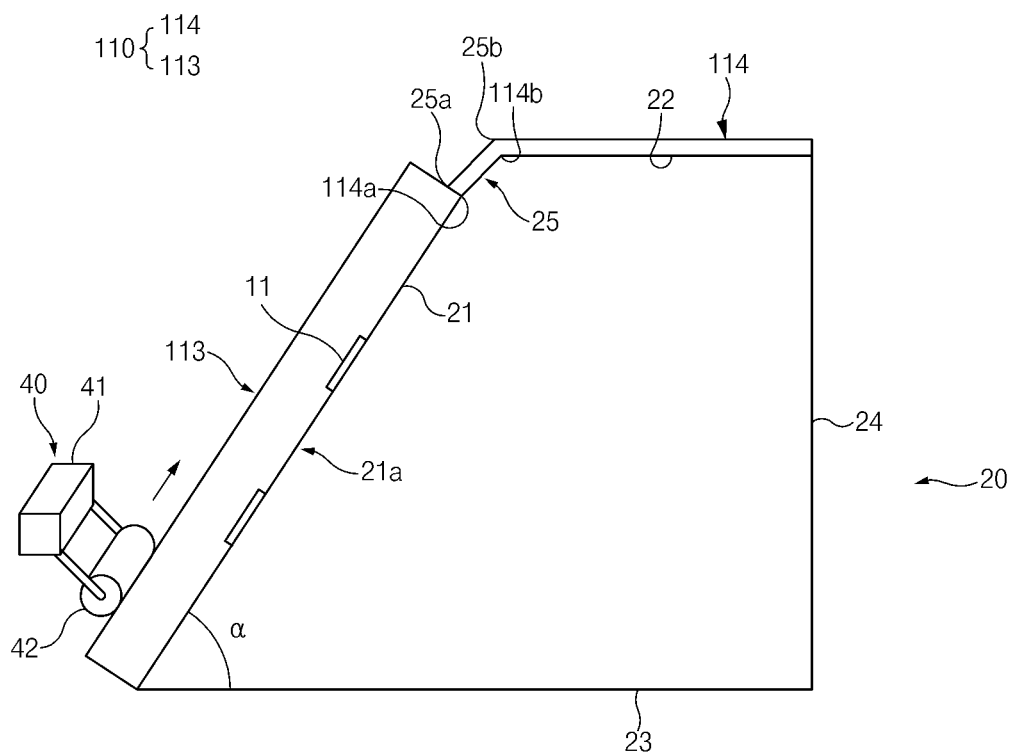
FIG. 10 is a side view illustrating an example of a pressing step in a method for a secondary battery according to a third embodiment of the present invention.

FIG. 10 is a side view illustrating an example of a pressing step in a method for a secondary battery according to a third embodiment of the present invention.

Referring to FIG. 10, a method for manufacturing a secondary battery according to a third embodiment of the present invention is different from the method for manufacturing the secondary battery according to the foregoing first embodiment of the present invention in a manner of pressing the secondary battery in a pressing step. Thus, contents of this embodiment, which are duplicated with those according to the first and second embodiments, will be briefly described, and also, differences therebetween will be mainly described.

In more detail, in the pressing step of the method for manufacturing the secondary battery according to the third embodiment of the present invention, a pusher provided as a roll press 40 may roll an outer surface of a body 113 to press the body 113. Here, the roll press 40 may comprise a roll 42 and a support part 41 on which the roller 42 is rotatably supported. An outer surface of the roll 42 may be provided as a flexible member. Thus, in the pressing step, when the body 113 is pressed through the roll 42 of the roll press 40, the body 13 may be prevented from being damaged or deformed such as crease and also may be uniformly pressed even though the surface to be pressed of the body is irregular. Also, the outer surface of the roll 42 may be made of a heat-resistant and insulating material as another example. Thus, in the pressing step, when the body 113 is pressed through the roll 42 of the roll press 40, the roll 42 may be prevented from being deformed by the body 113 having a high temperature due to the charging and discharging and also be prevented from being electrically conducted with the body 113. Particularly, the outer surface of the roll 42 may be made of, for example, silicon that is a heat-resistant and flexible material.

Also, in the pressing step, the roll press 40 may be rolled upward from a lower portion of the body 113 to induce the internal gas accommodated in the accommodation part 11 so that the internal gas is discharged to the outside through the gas pocket part 113. Thus, the outer surface of the body 113, which is inclined and seated on the support block 20, may be easily pressed to easily discharge the internal gas to the gas pocket part 114.

Figure 11:
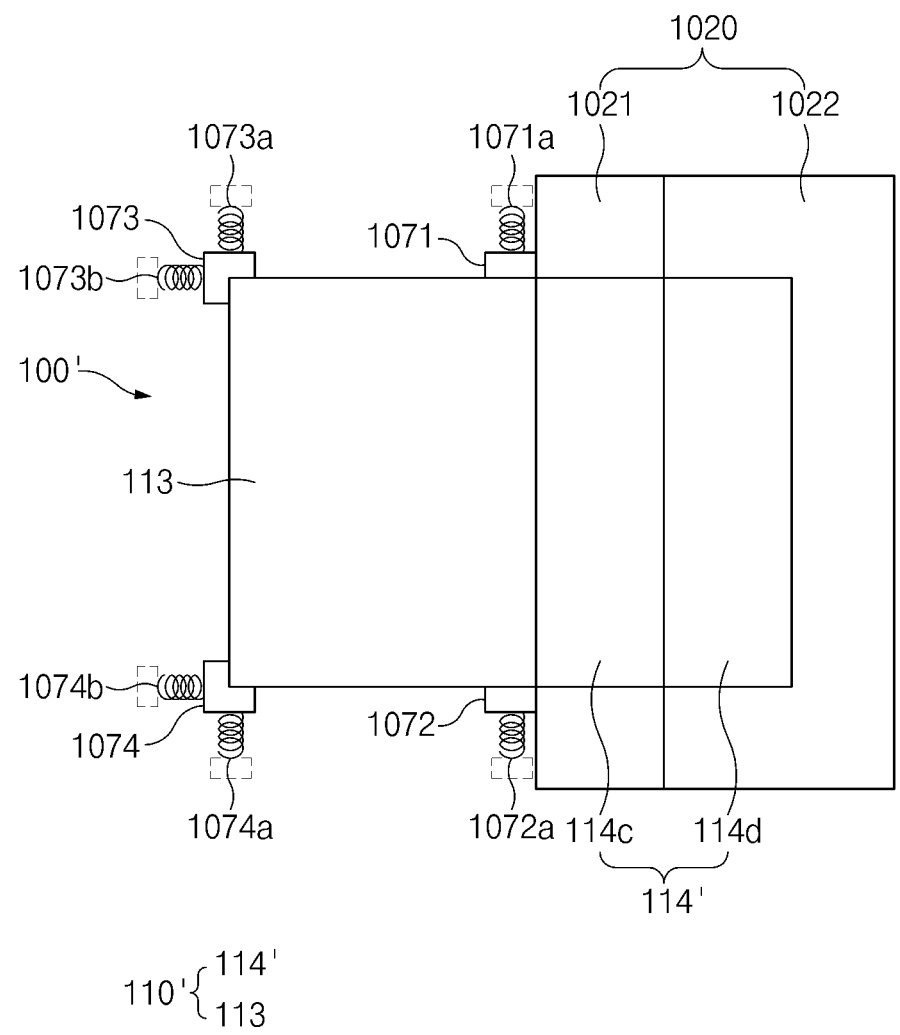
FIG. 11 is a plan view illustrating an example of a seating step in a method for a secondary battery according to a fourth embodiment of the present invention.
Figure 12:
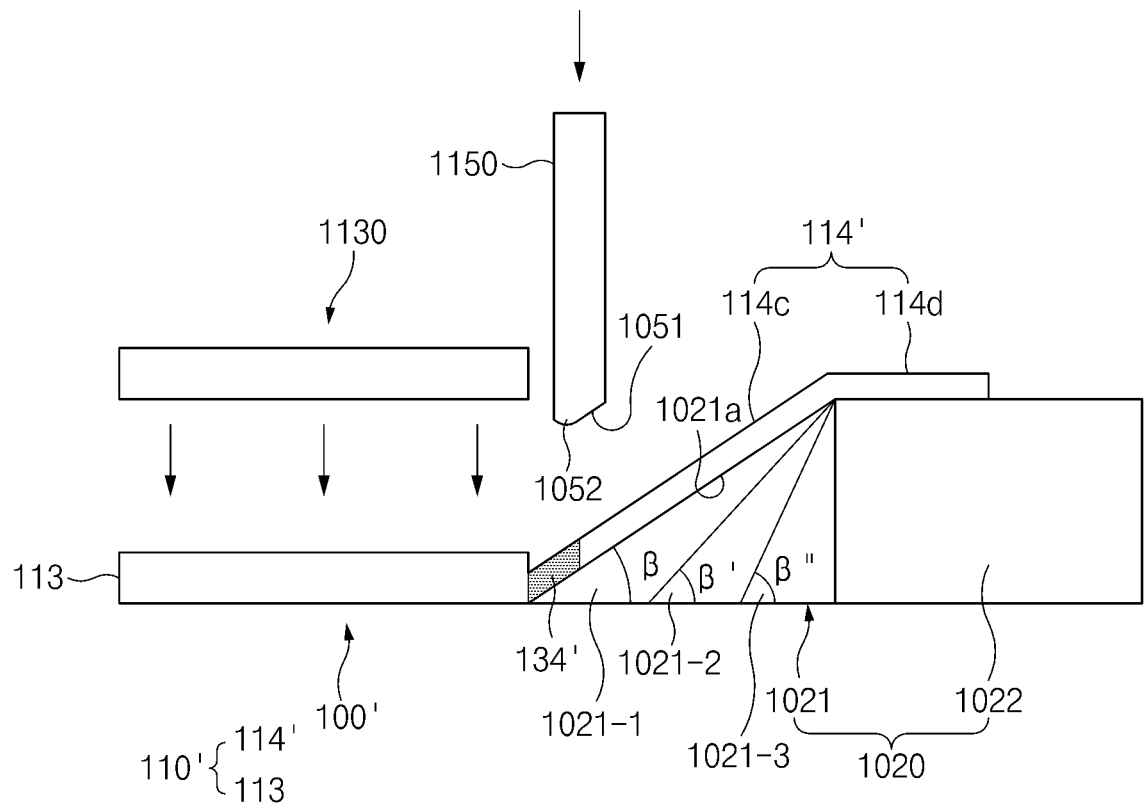
FIG. 12 is a side view illustrating an example of a gas discharge step in the method for the secondary battery according to the fourth embodiment of the present invention.

FIG. 11 is a plan view illustrating an example of a seating step in a method for a secondary battery according to a fourth embodiment of the present invention, and FIG. 12 is a side view illustrating an example of a gas discharge step in the method for the secondary battery according to the fourth embodiment of the present invention.

Figure 14:
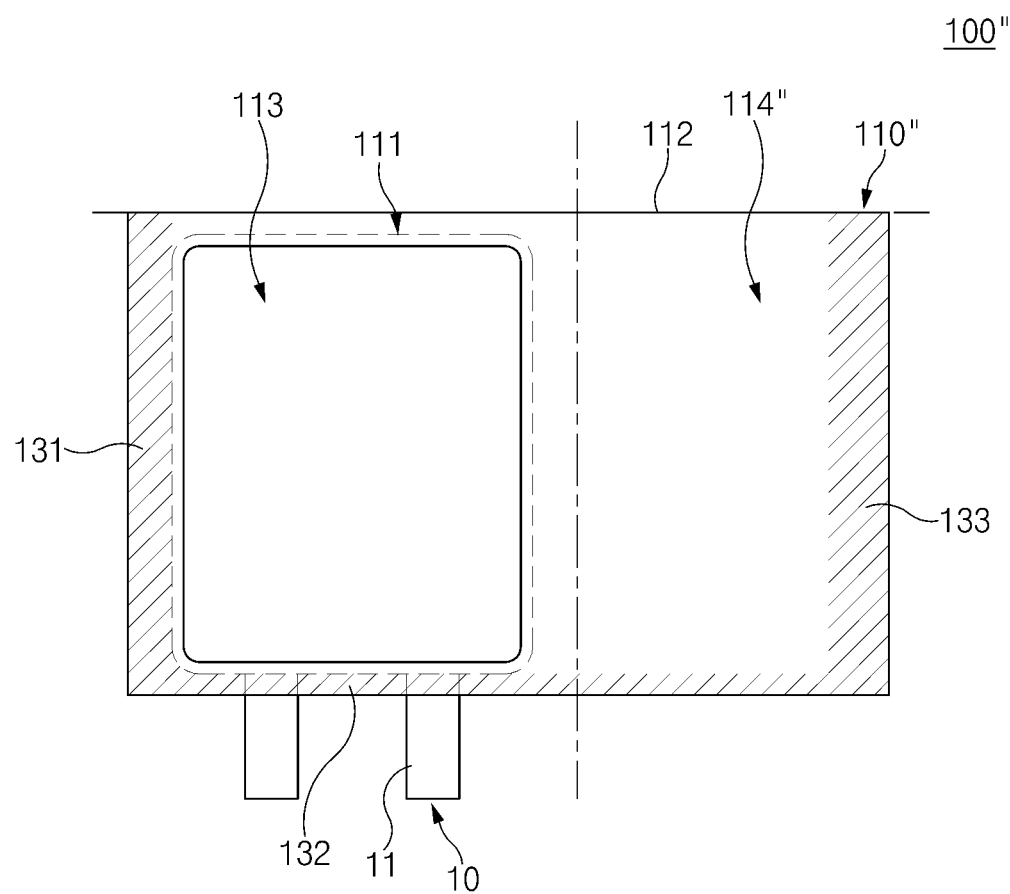
FIG. 14 is a plan view illustrating an example of a first sealing step of the formation step in the method for the secondary battery according to the fifth embodiment of the present invention.

Referring to FIGS. 10 and 14, a method for manufacturing a secondary battery according to a fourth embodiment of the present invention is different from the method for manufacturing the secondary battery according to each of the foregoing first to third embodiments of the present invention in that a gas pocket part 114' is seated on an inclined part 1021*a* of a support block 1020. Thus, contents of this embodiment, which are duplicated with those according to the forgoing embodiment, will be briefly described, and also, differences therebetween will be mainly described.

In more detail, the method for manufacturing the secondary battery according to the fourth embodiment of the present invention comprises a formation step of accommodating an electrode assembly and an electrolyte into a body 113 of a battery case 110' having an accommodation part and forming a gas pocket part 114', in which a passage extending from the accommodation part to the outside is formed to discharge an internal gas accommodated in the accommodation part, in the battery case 110', a seating step of seating the gas pocket 114' on a support block 1020, which has an inclined part 1021*a* on a side surface thereof, to support the gas pocket 114' in the battery case 110', and a gas discharge step of pressing the body 113 to discharge a gas accommodated in the accommodation part through the gas pocket part 114' in the battery case 110'. Also, the method for manufacturing the secondary battery according to the fourth embodiment of the present invention may further comprise an activation step of charging/discharging an electrode assembly 10 to activate the electrode assembly 10 and a second sealing step of sealing the battery case 110.

In more detail, in the formation step, the electrode assembly and the electrolyte may be accommodated in the battery case 110', and the gas pocket part 114' providing the passage for discharging the internal gas may be formed. Here, in the formation step, for example, the battery case 110 comprising a body 113, in which an accommodation part is formed, and the gas pocket part 114, in which the passage extending from the accommodation part to the outside may be formed.

The formation step may further comprise a first sealing step of sealing an edge of the battery case 110 to seal the accommodation part and the gas pocket part 114.

In the seating step, the gas pocket part 114' of the battery case 110' may be seated on the inclined part 1021*a* of the support block 1020. Also, the support block 1020 may comprises a triangular block 1021 and a rectangular block 1022, each of which has the inclined part 1021*a*.

In the seating step, an extension part 114*c* of the gas pocket part 114', which extends from the body 113, may be seated on the inclined part 1021*a* of the triangular block 1021, and an end 114*d* of the gas pocket part 114' may be seated on the rectangular block 1022. Here, the inclined part 1021*a* of the triangular block 1021 may be inclined at a predetermined angle ß from a bottom surface.

In the seating step, for example, the triangular block 1021 may be provided in plurality. The plurality of triangular blocks 1021 may be sequentially disposed from a side surface of the rectangular block 1022 to adjust the inclined angle ß of the inclined part 1021*a*. Here, as the plurality of triangular blocks 1021 are sequentially additionally disposed, the inclined angle ß may decreases. On the other hand, as the plurality of triangular blocks 1021 are sequentially removed, the inclined angle ß may increase. That is, for example, when only a first triangular block 1021-1 is disposed on the side surface of the rectangular block 1022, the inclined angle ß" may be equal to or greater than 60 degrees. When a second triangular block 1021-2 is seated on an inclined surface of the first triangular block 1021-1, the inclined angle ß' at which the gas pocket part 114' is seated may be equal to or greater than 45 degrees. When a third triangular block 1021-3 is further seated on an inclined surface of the second triangular block 1021-2, the inclined angle ß at which the gas pocket part 114' is seated may be equal to or greater than 30 degrees.

Also, in the seating step, for another example, one of the plurality of triangular blocks 1021 having various inclinations may be selected to be disposed adjacent to the rectangular block 1022 so as to adjust the inclined angle ß of the extension part 114*c* seated on the triangular blocks 1021.

The seating step may further comprise a fixing step of fixing corner portions of the body 113 through fixing blocks 1071, 1072, 1073, and 1074. Thus, in the gas discharge step, a secondary battery 100' may be prevented from moving (see FIG. 11).

Here, in the fixing step, for example, when the gas pocket part 114' of the battery case is seated on the support block 1020, the fixing blocks 1071, 1072, 1073, and 1074 may be disposed to correspond to four corners of the body 113 of the battery case 110' to prevent the secondary battery 100' from moving.

In the fixing step, for another example, when the gas pocket part 114' of the battery case 110' is seated on the support block 1020, the four corners of the body 113 of the battery case 110' may be fixed through the fixing blocks 1071, 1072, 1073, and 1074, which are elastically supported by elastic members 1071a, 1072a, 1073a, 1073b, 1074a, and 1074b. Here, the elastic members 1071a, 1072a, 1073a, 1073b, 1074a, and 1074b may be provided as, for example, compression coil springs. Thus, the secondary battery 100' having various sizes may be fixed through the fixing blocks 1071, 1072, 1073, and 1074 by the elastic members 1071a, 1072a, 1073a, 1073b, 1074a, and 1074b. That is, for example, the secondary battery having a large size may be fixed by the fixing blocks 1071, 1072, 1073, and 1074 while contracting the elastic members 1071a, 1072a, 1073a, 1073b, 1074a, and 1074b. The secondary battery having a small size may be fixed by the fixing blocks 1071, 1072, 1073, and 1074 in a state in which the elastic members 1071a, 1072a, 1073a, 1073b, 1074a, and 1074b are not contracted.

In the gas discharge step, the body 113 of the battery case 110' may be pressed to discharge the gas accommodated in the accommodation part through the gas pocket part 114'.

Also, the gas discharge step may further comprise a piercing step of piercing the gas pocket part 114' so that the internal gas is discharged through the gas pocket part 114'.

The gas discharge step may further comprise a pressing step of pressing the body 113 of the battery case 110' through a pusher 1130. Thus, the body 113 may be pressed to easily discharge the internal gas to discharge holes of the gas pocket part 114', which are formed in the piercing step. Here, in the seating step, the body 113 of the battery case 110' may be disposed parallel to the ground, the extension part 114c of the gas pocket part 114' may be seated to be inclined on the inclined part 1021a of the triangular block 1021, and the end 114d of the gas pocket part is seated on an upper portion of the rectangular block 1022 that is parallel to the ground. Then, the body 113 may be pressed in the pressing step to facilitate the discharge of the internal gas and prevent the electrolyte from being discharged.

In the second sealing step, the opened portion of the battery case 110' may be thermally fused to seal the battery case 110'.

Also, in the second sealing step, a portion of the gas pocket part 114', which is adjacent to the accommodation part in the battery case 110', may be thermally fused through a sealing press 1150 to form the battery case 110'.

Furthermore, in the second sealing step, a pressure may be vertically applied by using the sealing press 1050 having a sealing surface 1051 in a shape corresponding to the inclination of the sealing portion of the battery case 110' on an end surface thereof to perform the thermal fusion, thereby forming a sealing part 134'. Here, in the second sealing step, heat is applied to the sealing press 1050 having the sealing surface 1051 in the shape corresponding to the inclined portion of the gas pocket part 114', which is adjacent to the accommodation part) of the battery case 110', to perform the pressing, thereby sealing the battery case 110'.

Here, an end 1052 of the sealing press 1050 may be formed in a rounded shape to prevent a pressed portion of the battery case 110' from being damaged when the battery case 110' is pressed.

Hereinafter, a method for manufacturing a secondary battery according to a fifth embodiment of the present invention will be described in more detail with reference to FIGS. 13 to 19.

Figure 13:
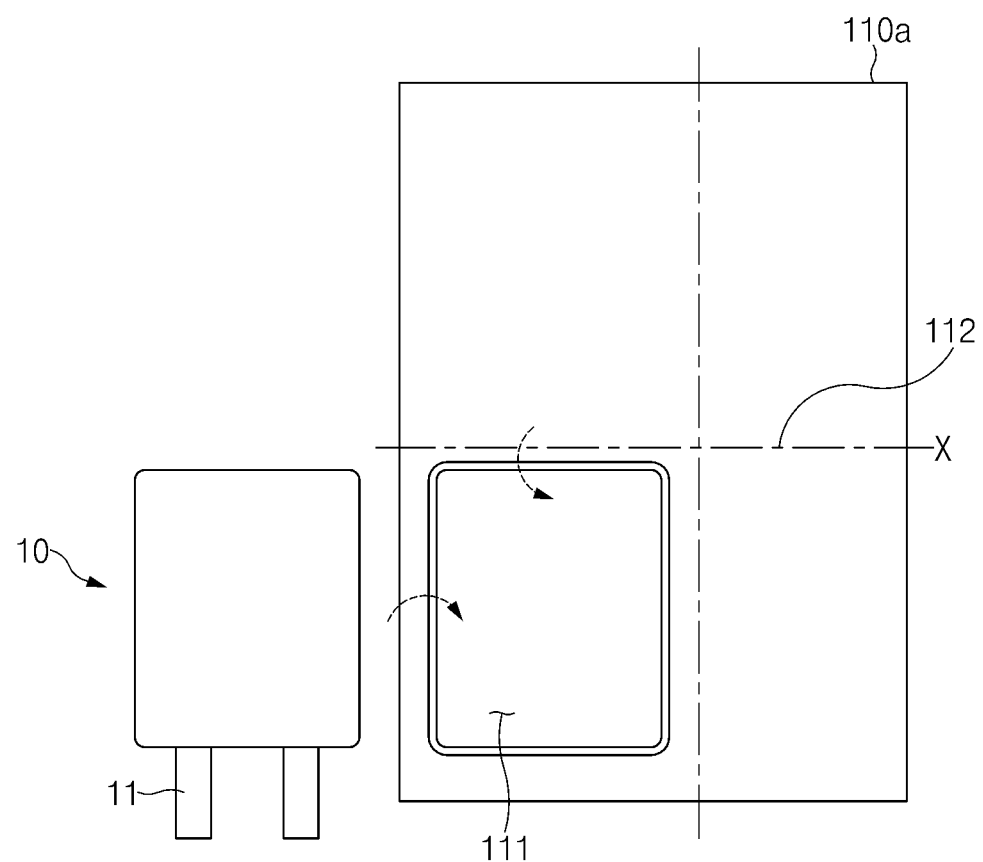
FIG. 13 is a plan view illustrating an example of a formation step in a method for a secondary battery according to a fifth embodiment of the present invention.
Figure 15:
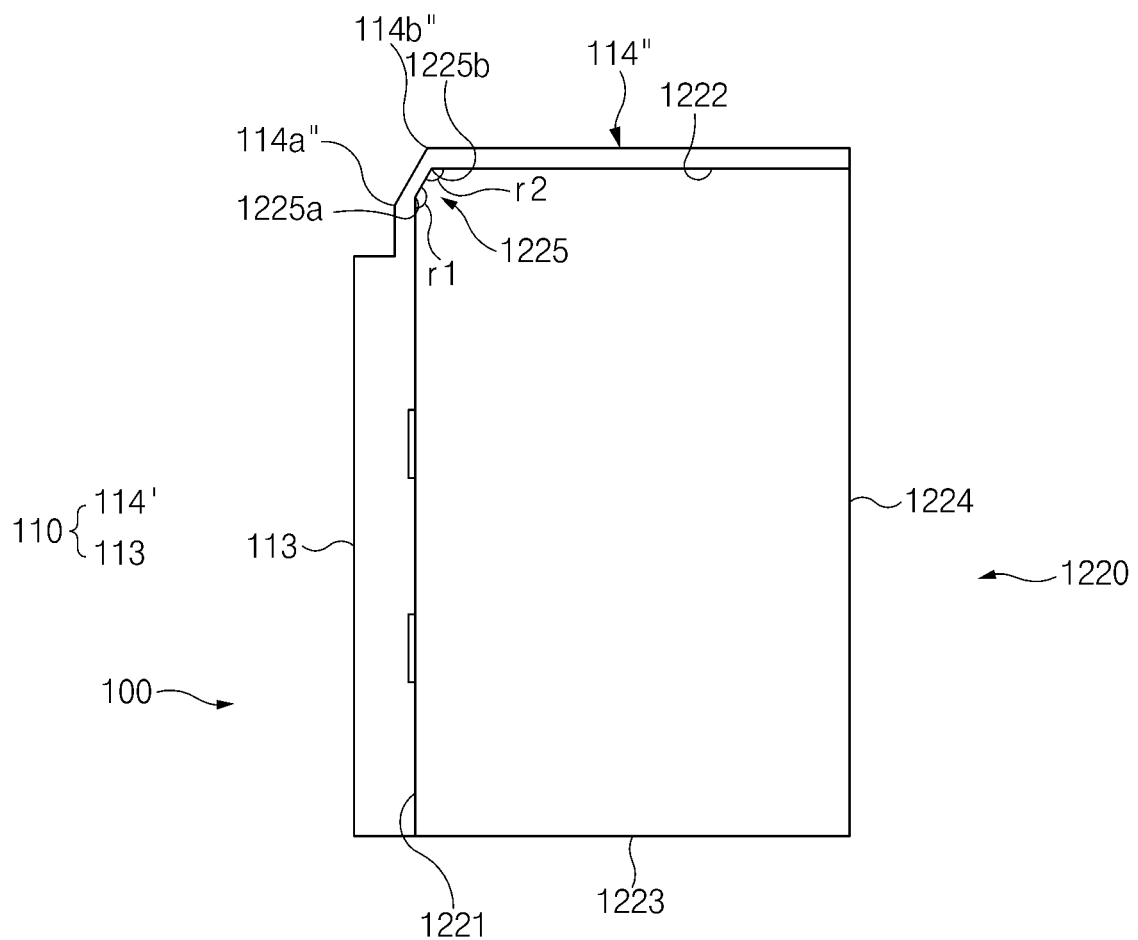
FIG. 15 is a side view illustrating an example of a supporting step in the method for the secondary battery according to the fifth embodiment of the present invention.

FIG. 13 is a plan view illustrating an example of a formation step in the method for the secondary battery according to the fifth embodiment of the present invention, FIG. 14 is a plan view illustrating an example of a first sealing step of the formation step in the method for the secondary battery according to the fifth embodiment of the present invention, and FIG. 15 is a side view illustrating an example of a supporting step in the method for the secondary battery according to the fifth embodiment of the present invention.

Referring to FIGS. 13 to 15, the method for manufacturing the secondary battery according to the fifth embodiment of the present invention is different from the method for manufacturing the secondary battery according to the foregoing first to fourth embodiments of the present invention in a manner of supporting a battery case 110" on a support block 1120. Thus, contents of this embodiment, which are duplicated with those according to the first to fourth embodiments, will be briefly described, and also, differences therebetween will be mainly described.

The method for manufacturing the secondary battery according to the fifth embodiment of the present invention may manufacture a secondary battery 100" by comprising a formation step of forming a gas pocket part 114" in a battery case 110", a supporting step of supporting the battery case 110", and a gas discharging step of pressing the battery case 110" to discharge an internal gas.

Also, the method for manufacturing the secondary battery according to the fifth embodiment of the present invention may further comprise an activation step of charging/discharging an electrode assembly to activate the electrode assembly and a second sealing step of sealing the battery case 110".

In more detail, in the formation step, the electrode assembly and the electrolyte may be accommodated in the battery case 110", and the gas pocket part 114" providing the passage for discharging the internal gas may be formed. Here, in the formation step, for example, the battery case 110" comprising a body 113, in which an accommodation part 111 is formed, and the gas pocket part 114", in which the passage extending from the accommodation part 111 to the outside is formed. Here, the accommodation part 111 may accommodate the electrode assembly 10 and the electrolyte.

Also, in the formation step, a pouch sheet 110a is folded so that both surfaces thereof contact each other to form the battery case 110 comprising the accommodation part 111 and the gas pocket part 114. Here, in the formation step, a bending line 112 with respect to a virtual line X is formed on the pouch sheet 110a, and then, the pouch sheet 110a is folded along the bending line 112 to form the battery case 110. Here, in the formation step, the pouch sheet 110a has both surfaces with respect to the bending line 112 so that the opened accommodation part 111 is formed on one surface, and the other surface covers the accommodation part 111. For example, the pouch sheet 110a may comprise a base material, aluminum (Al), and a resin. Here, the base material may be, for example, a nylon material. The pouch sheet 110a may be formed by sequentially laminating a resin layer, an aluminum layer, and a nylon layer in an outward direction from the inside in which the accommodation part 111 is formed.

Also, the accommodation part 111 of the battery case 110", which is formed through the formation step, may form an accommodation space for accommodating the electrode assembly 10 and the electrolyte.

Furthermore, the gas pocket part 114" of the battery case 110", which is formed through the formation step, may collect a gas generated in the accommodation part 111 accommodating the electrode assembly 10.

In the formation step, the electrode assembly 10 in which an electrode and a separator are alternately laminated may be accommodated in the battery case 110". Here, an electrode lead 11 may be provided on the electrode assembly 10 to electrically connect the electrode assembly 10 to the outside of the battery case 110".

The formation step may further comprise a first sealing step of sealing edges 131, 132, and 133 of the battery case 110" to seal the accommodation part 111 and the gas pocket part 114. Here, in the first sealing step, the electrode assembly 10 may be accommodated in the accommodation part 111 of the battery case 110", and the remaining edges 131 and 132 of the battery case 110" except for the edge 133 disposed on an end of the gas pocket part 114" may be sealed. Then, the electrolyte may be injected into the accommodation part 111 through the end of the gas pocket part 114", and the edge 133 disposed on the end of the gas pocket part 114" may be sealed to seal the battery case 110".

Referring to FIG. 15, in the supporting step, the battery case 110" may be disposed to be supported on a support block 1220.

In the supporting step, the body 113 of the battery case 110" may be disposed on a side surface 1221 of the support block 1220, and the gas pocket part 114" may be bent to be disposed on a top surface 1222 of the support block 1220. Here, the support block 1220 may be provided with, for example, the vertical side surface 1221 and the horizontal top surface 1222. The side surface 1221 of the support block 1220, which faces the body 113 of the battery case 110", may be formed to be perpendicular to a floor surface such as a bottom surface 1223 or the ground.

For example, the support block 1220 may have a rectangular column shape. Here, the support block 1220 may be formed as a plane of which the top surface 1222 and the bottom surface 1223 are parallel to each other and a plane of which both side surfaces 1221 and 1224 are parallel to each other.

Also, in the supporting step, the body 113 of the battery case 110" may be vertically disposed to face the side surface 1221 of the support block 1220, and the body 113 of the gas pocket part 114" may be bent at a right angle with respect to the body 113 so as to be seated on the top surface 1222 of the support block 1220.

In the support block 1220, for example, a corner portion 1225 facing bent portions 114a" and 114b" at which the gas pocket part 114" is bent, may be chamfered to form a plurality of bent parts 1225a and 1225b. Here, the plurality of bent parts 1225a and 1225b may be formed as two-stage bent parts 1225a and 1225b. In the supporting step, the gas pocket part 114" may be bent in two stages in a shape corresponding to the two-stage bent parts 1225a and 1225b of the support block 1220. Thus, when the gas pocket part 114" is bent at the right angle with respect to the body 113, the bent portions 114a" and 114b" may be completely bent to close a passage formed in the gas pocket part 114", and thus, the internal gas may be discharged.

Here, for example, bent angles r1 and r2 of the two-stage bent parts 1225a and 1225b of the support block 1220 may be greater than an angle of 120 degrees. Thus, as the bent angles r1 and r2 of the two-stage bent parts 1225a and 1225b of the support block 1220 are greater than the angle of 120 degrees, excessive bending may occur to allow the internal gas to be smoothly discharged.

In the supporting step, the gas pocket part 114" may be supported by using the support block 1220 of which the top surface 1222 has an inclination that gradually decreases in height toward an end of the gas pocket part 114".

In the activation step, the electrode assembly 10 may be charged and discharged to be activated. Here, in the activation step, the electrode assembly 10 may be charged and discharged before the gas discharging step so as to discharge the gas generated during the charging/discharging to the outside in the gas discharge step.

Figure 16:
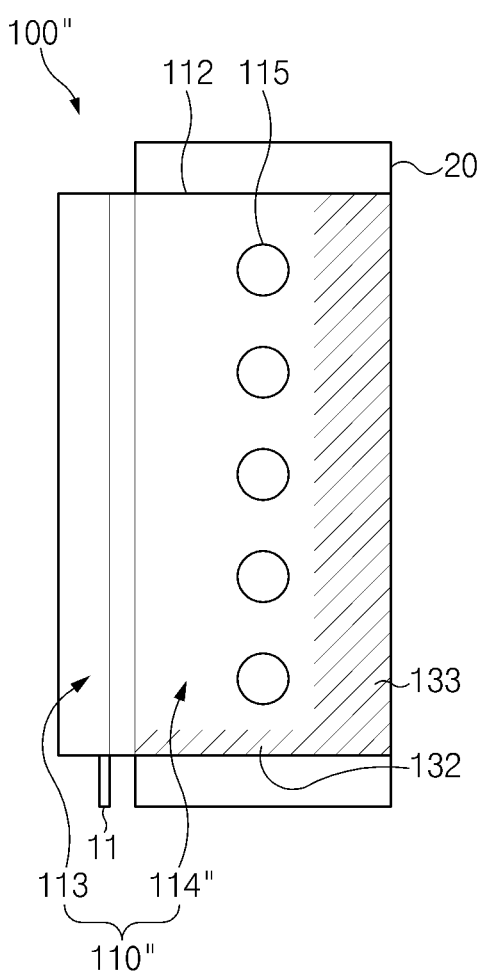
FIG. 16 is a plan view illustrating an example of a piercing step of a gas discharge step in the method for the secondary battery according to the fifth embodiment of the present invention.
Figure 17:
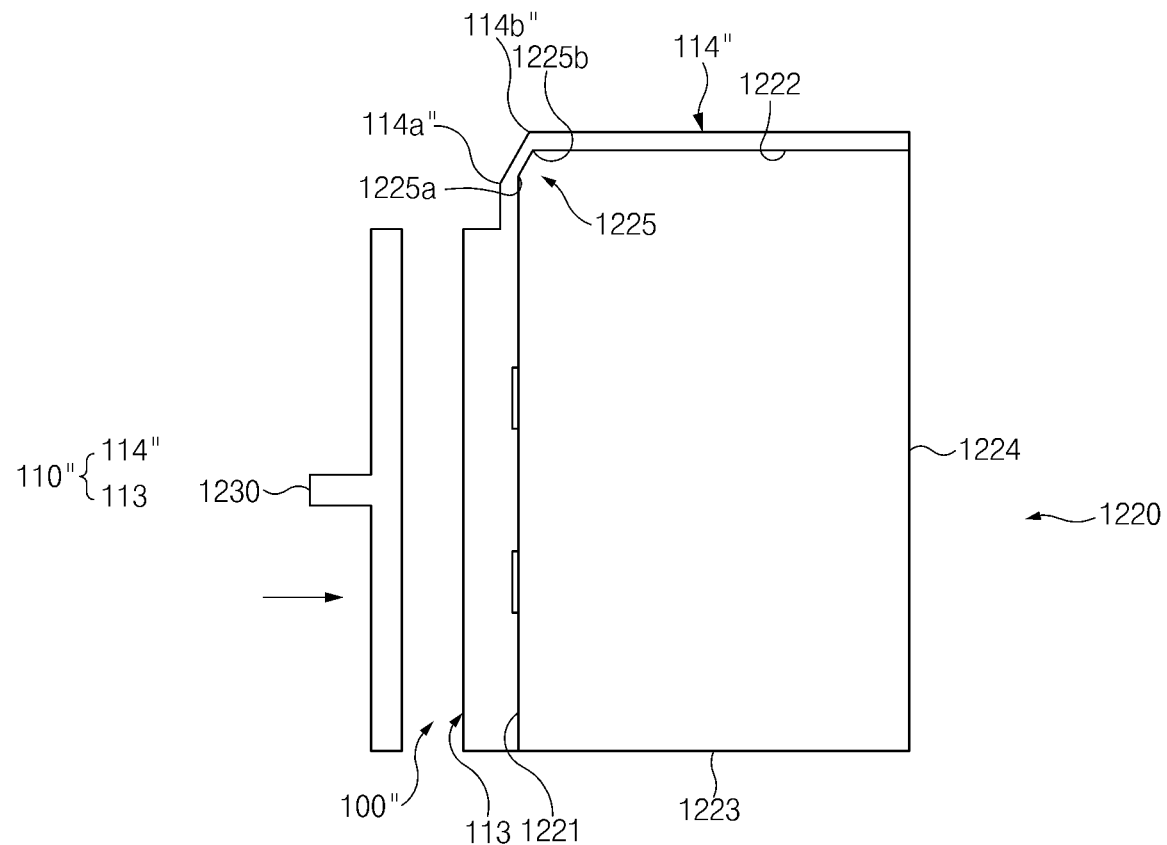
FIG. 17 is a side view illustrating an example of a pressing step of the gas discharge step in the method for the secondary battery according to the fifth embodiment of the present invention.

FIG. 16 is a plan view illustrating an example of a piercing step of a gas discharge step in the method for the secondary battery according to the fifth embodiment of the present invention, and FIG. 17 is a side view illustrating an example of a pressing step of the gas discharge step in the method for the secondary battery according to the fifth embodiment of the present invention.

Referring to FIGS. 16 and 17, in the gas discharge step, the body 113 of the battery case 110" may be pressed to discharge the gas accommodated in the accommodation part 111" through the gas pocket part 114".

Also, referring to FIG. 16, the gas discharge step may further comprise a piercing step of piercing the gas pocket part 114" so that the internal gas is discharged through the gas pocket part 114". Here, for example, a plurality of discharge holes 115 for discharging the gas may be formed in the gas pocket part 114". The gas pocket part 114" may be seated on the top surface 1222 of the support block 1220 to facilitate the formation of the discharge holes 115 through a piercing device.

Referring to FIG. 17, the gas discharge step may further comprise a pressing step of pressing the body 113 of the battery case 110" through a pusher 1230. Thus, the body 113 may be pressed to easily discharge the internal gas to the discharge holes 115 of the gas pocket part 114", which are formed in the piercing step. Here, the body 113 of the battery case 110" may be disposed on the side surface 1221 of the support block 1220, and the gas pocket part 114" may be disposed on the top surface 1222 of the support block 1220. As a result, the electrolyte is discharged together when the gas is discharged through the gas pocket part 114", the electrolyte discharged into the body 113 may not flow to prevent the secondary battery 100" from being contaminated.

In the pressing step, when the body 113 of the battery case 110" is pressed, vacuum may be applied together to discharge the internal gas to the outside. Here, the secondary battery 100" may be disposed in a vacuum chamber (not shown), and then, the inside of the vacuum chamber may be vacuumized to apply vacuum to the secondary battery 100". Here, the support block 1220 and the pusher 1230 may be accommodated into the vacuum chamber together with the secondary battery 100".

Figure 18:
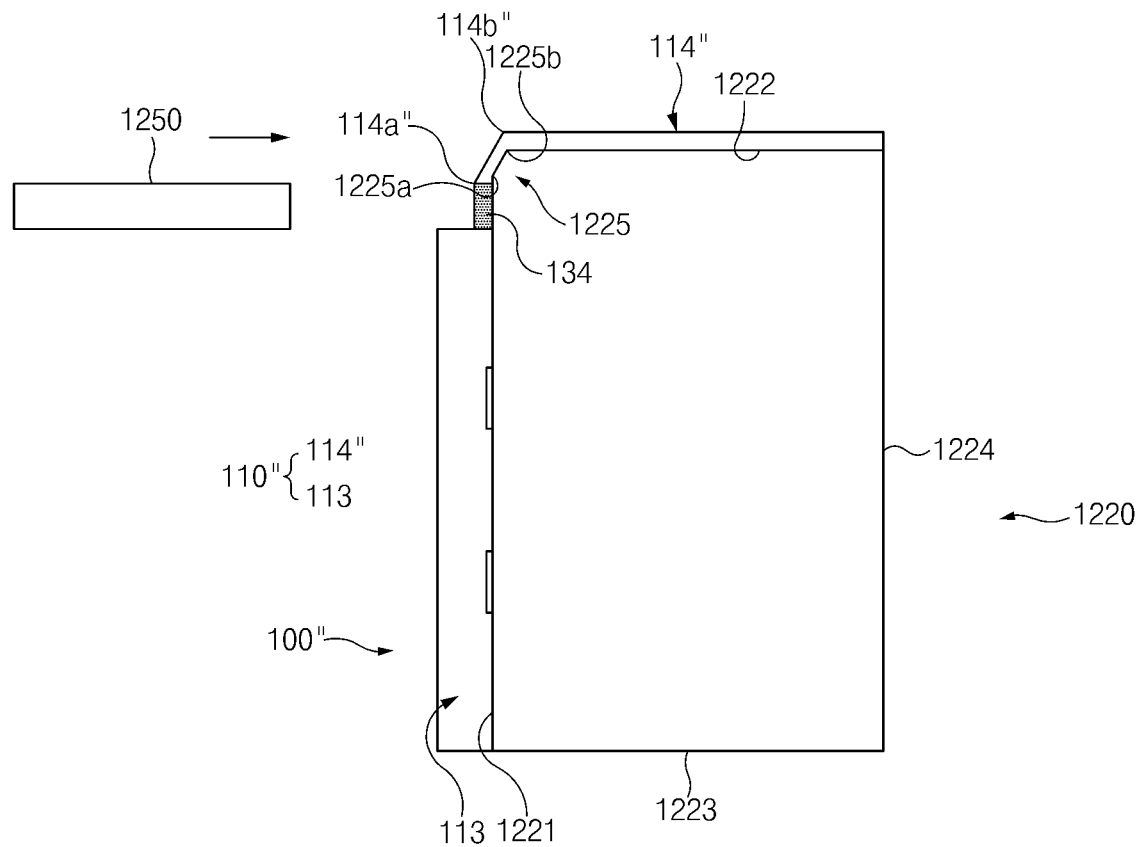
FIG. 18 is a side view illustrating an example of a second sealing step in the method for the secondary battery according to the fifth embodiment of the present invention.
Figure 19:
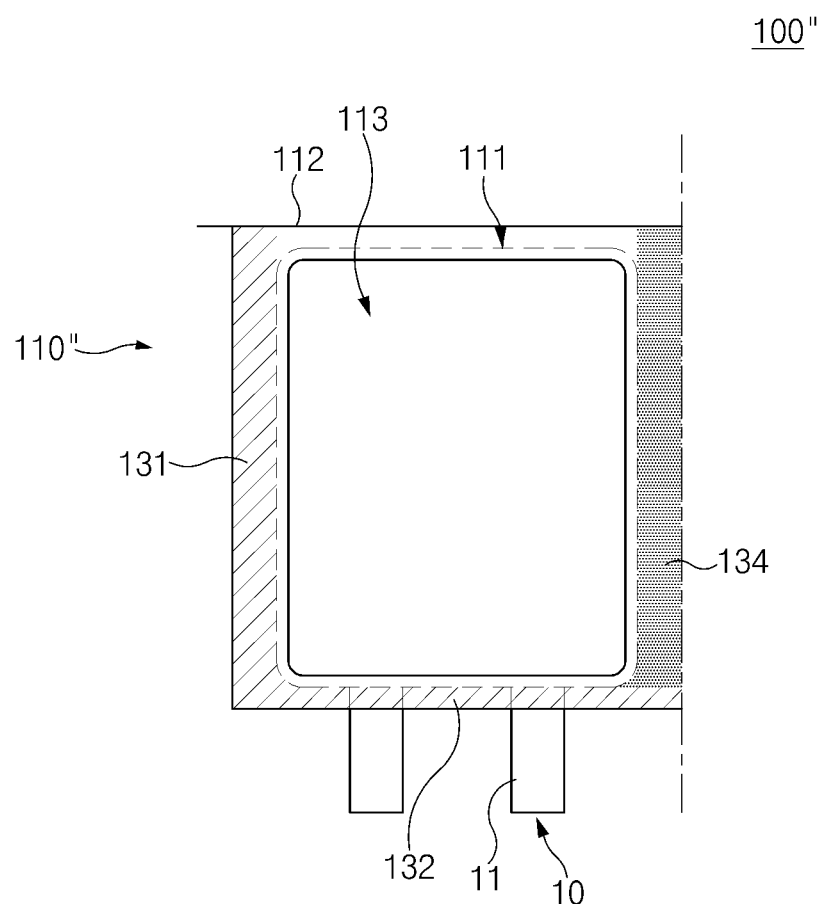
FIG. 19 is a plan view illustrating an example of the second sealing step in the method for the secondary battery according to the fifth embodiment of the present invention.

FIG. 18 is a side view illustrating an example of a second sealing step in the method for the secondary battery according to the fifth embodiment of the present invention, and FIG. 19 is a plan view illustrating an example of the second sealing step in the method for the secondary battery according to the fifth embodiment of the present invention.

Referring to FIGS. 18 and 19, in the second sealing step, the opened portion of the battery case 110" may be thermally fused to seal the battery case 110".

Referring to FIG. 18, in the second sealing step, a portion of the gas pocket part 114", which is adjacent to the accommodation part 111 in the battery case 110", may be thermally fused through a sealing press 1250 to form the battery case 110".

Thereafter, referring to FIG. 19, in the second sealing step, the remaining portion except for the battery case 110" in the gas pocket part 114" may be cut to be removed.

Referring to FIG. 17, as described above, in the method for manufacturing the secondary battery according to the fifth embodiment of the present invention, when the body 113 of the battery case 110" is pressed to discharge the internal gas through the gas pocket part 114", the body 113 may be erected with respect to the bottom surface of the battery case 110", and the gas pocket part 114" may be bent at the right angle so as to be seated on the top surface 1222 of the support block 1220. Thereafter, the gas pocket part 114" may be pierced to discharge the internal gas. Thus, when the secondary battery 100" may be vertically erected with respect to the bottom surface to discharge the internal gas, it may be possible to prevent the electrolyte from flowing to contaminate the body 113 of the battery case 110".

Figure 20:
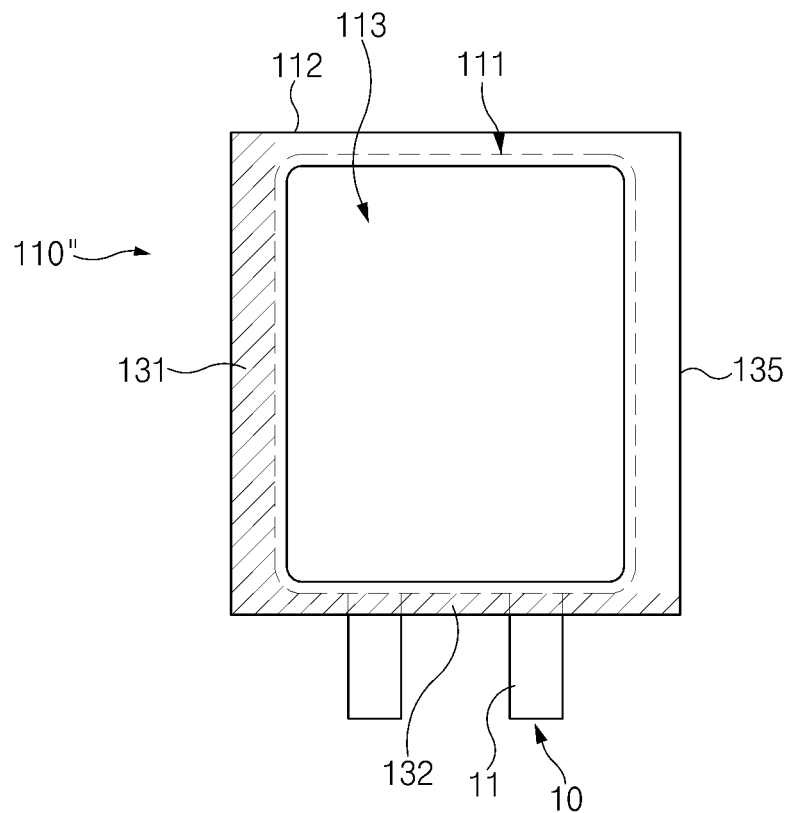
FIG. 20 is a plan view illustrating an example of a second sealing step in a method for a secondary battery according to a sixth embodiment of the present invention.
Figure 21:
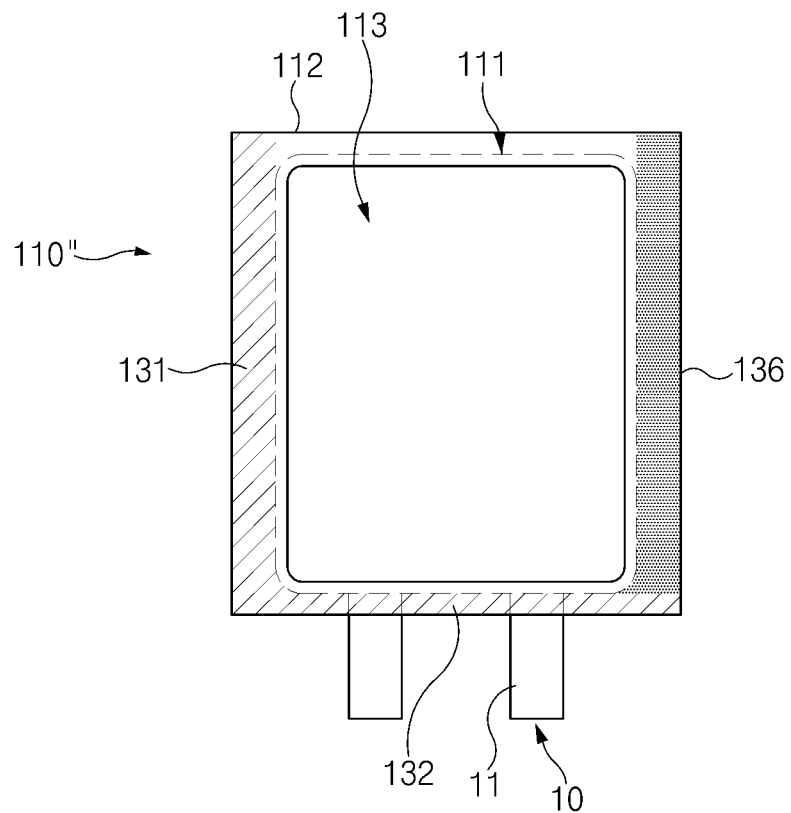
FIG. 21 is a plan view illustrating an example of the second sealing step in the method for the secondary battery according to the sixth embodiment of the present invention.

FIG. 20 is a plan view illustrating an example of a second sealing step in a method for a secondary battery according to a sixth embodiment of the present invention, and FIG. 21 is a plan view illustrating an example of the second sealing step in the method for the secondary battery according to the sixth embodiment of the present invention.

Referring to FIGS. 20 and 21, a method for manufacturing a secondary battery according to a sixth embodiment of the present invention is different from the method for manufacturing the secondary battery according to the foregoing fifth embodiment of the present invention in that a gas pocket part 114 is cut and then sealed in a second sealing step. Thus, contents of this embodiment, which are duplicated with those according to the fifth embodiment, will be briefly described, and also, differences therebetween will be mainly described.

In more detail, in the second sealing step of the method for manufacturing the secondary battery according to the sixth embodiment of the present invention, a gas pocket part 114" adjacent to an accommodation part 111 of a battery case 110" may be cut, and then, a cut portion 135 may be thermally fused to be sealed. Here, in the second sealing step, for example, a remaining portion of the gas pocket part 114" except for the portion adjacent to the accommodation part 111 of the gas pocket part 114" may be cut to be removed, and then, the portion of the gas pocket part 114", which adjacent to the accommodation part 111, may be thermally fused to form a sealing part 136. Thus, the accommodation part 111 of the battery case 110" may be completely sealed.

Figure 22:
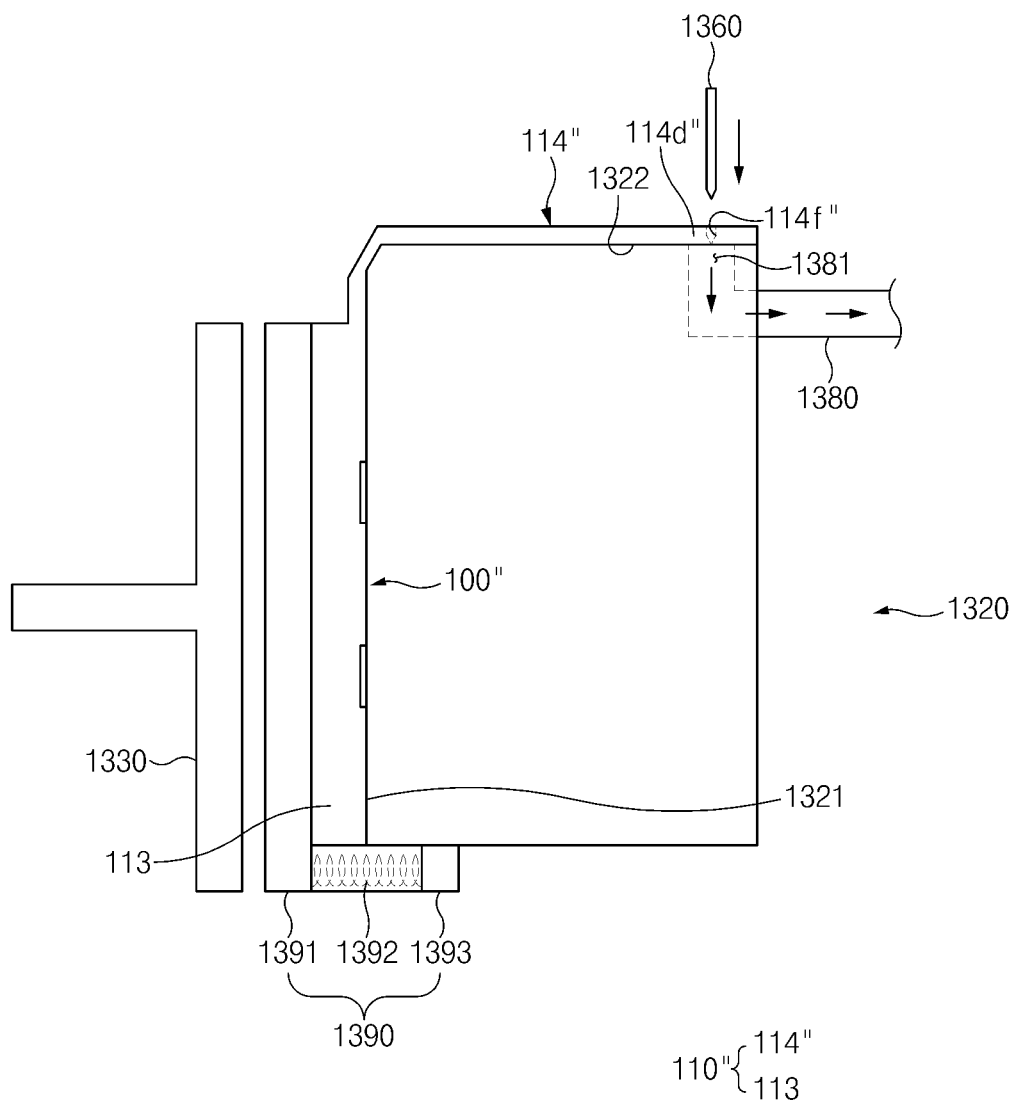
FIG. 22 is a side view illustrating an example of a method for a secondary battery according to a seventh embodiment of the present invention.
Figure 23:
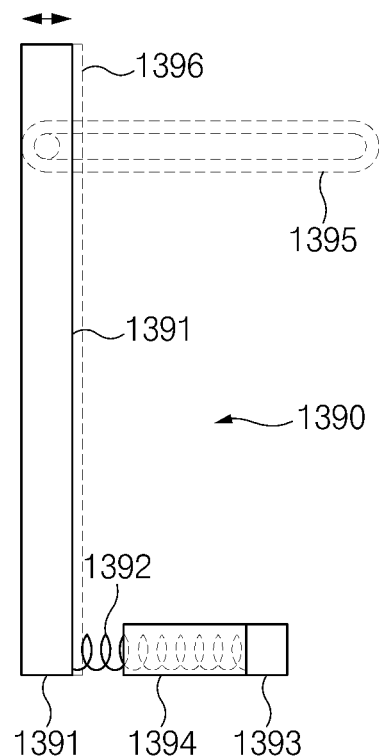
FIG. 23 is a conceptual side view illustrating an operation of a fixing means of FIG. 12.

FIG. 22 is a side view illustrating an example of a method for a secondary battery according to a seventh embodiment of the present invention, and FIG. 23 is a conceptual side view illustrating an operation of a fixing means of FIG. 12.

Referring to FIGS. 22 and 23, a method for manufacturing a secondary battery according to a seventh embodiment of the present invention is different from the method for manufacturing the secondary battery according to the foregoing fourth embodiment of the present invention in that a supporting step further comprises a vacuum fixing step and a fixing step. Thus, contents of this embodiment, which are duplicated with those according to the forgoing embodiment, will be briefly described, and also, differences therebetween will be mainly described.

The method for manufacturing the secondary battery according to the seventh embodiment of the present invention may manufacture a secondary battery 100" by comprising a formation step of forming a gas pocket part 114" in a battery case 110", a supporting step of supporting the battery case 110", and a gas discharging step of pressing the battery case 110" to discharge an internal gas. Also, the method for manufacturing the secondary battery according to the seventh embodiment of the present invention may further comprise an activation step of charging/discharging an electrode assembly 10 to activate the electrode assembly and a second sealing step of sealing the battery case 110".

In more detail, in the method for manufacturing the seventh embodiment of the present invention, the supporting step may further comprise a fixing step of closely attaching the battery case 110" to a support block 1320 through a fixing means 1390 to fix the battery case 110".

Here, the fixing means 1390 may comprise an attachment block 1391 and a tension coil spring 1392 providing tensile force that pulls the attachment block 1391 in a direction of the support block 1320.

In the fixing step, the battery case 110" may be disposed between the attachment block 1391 and the support block 1320 to fix the battery case 110" to a side surface 1321 of the support block 1320 through the tensile force applied to the attachment block 1391. Thus, the attachment block 1391 may be supported on a coil spring 1392 having elastic force to fix the secondary battery 100", and thus, the secondary battery 100" having various thicknesses may be easily installed. Here, the coil spring 1392 may move along an inner circumferential surface of a guide tube 1394 so as to be contracted and expanded. The coil spring 1392 may have one side fixed to the support body 1393 that is fixed in position and the other side coupled to the attachment block 1391.

Also, the fixing means 1390 may further comprise a guide part 1395 having one side fixed to the support block 1320. Thus, when the attachment block 1391 moves by the elastic force of the coil spring, the attachment block 1391 may move while being guided by the guide part 1395.

Thus, in the fixing step, the attachment block 1391 may be disposed in a direction parallel to the side surface of the support block 1320. Thus, when the secondary battery 100" is pressed through a pusher 1330 to discharge the internal gas, the pusher 1330 may uniformly press a surface of the secondary battery 100". Here, a flexible member 1395 may be further provided on an attached surface of the attachment block 1391, which faces the secondary battery 100", to uniformly surface-press the secondary battery 100", which has an uneven surface to be pressed, through the pusher 1330 when the secondary battery 100" is pressed.

Also, in the method for manufacturing the secondary battery according to the seventh embodiment of the present invention, the supporting step may further comprise the vacuum fixing step of fixing an end 114d" of a gas pocket part 114" to the support block 1320 through vacuum in the battery case 110".

Here, in the support block 1320, a suction hole 1391 of a vacuum tube 1380 connected to a vacuum part (not shown) may be provided in a top surface 1322 on which the end of the gas pocket part 114" is seated. For example, the vacuum part may be a vacuum pump.

In the vacuum fixing step, the inside of the vacuum tube 1380 may be vacuumized to vacuum-suction the end 114d" of the gas pocket part 114" through the suction hole 1381 of the vacuum tube 1380, thereby fixing the gas pocket part 114".

In the piercing step of the gas discharge step, a portion 114f" of the gas pocket part 114", which faces the suction hole 1381 of the vacuum tube 1380, may be penetrated through a piecing device 1360 to pierce the gas pocket part 114". Here, in the gas discharge step, the body 113 may be pressed while the vacuum fixing step is performed to discharge the gas.

While the present invention has been particularly shown and described with reference to exemplary embodiments thereof, it is to be understood that the scope of the present invention is not limited to the method for manufacturing the secondary battery according to the present invention. It will be understood by those of ordinary skill in the art that various changes in form and details may be made therein without departing from the spirit and scope of the invention.

Furthermore, the scope of protection of the present invention will be clarified by the appended claims.

The invention claimed is:

1. A method for manufacturing a secondary battery, the method comprising:
   a formation step of accommodating an electrode assembly and an electrolyte into a body of a battery case,
   wherein the body of the battery case comprises an accommodation part and a gas pocket part,
   wherein a passage is formed in the body of the battery case that extends from the accommodation part through the gas pocket part to an outside, and
   wherein the passage is capable of discharging an internal gas from the accommodation part;
   a supporting step of disposing the battery case so as to be supported on a support block; and
   a gas discharge step of pressing the body to discharge a gas accommodated in the accommodation part through the gas pocket part in the battery case,
   wherein, in the supporting step, the body of the battery case is disposed on a side surface of the support block, and the gas pocket part is bent to be disposed on a top surface of the support block.

2. The method of claim 1, wherein, in the gas discharge step, the body is pressed through a pusher.

3. The method of claim 1, wherein the side surface of the support block is vertical and the top surface is horizontal, and
   in the supporting step, the body of the battery case is vertically disposed to face the side surface of the support block, and the gas pocket part is bent at a right angle with respect to the body so as to be seated on the top surface of the support block.

4. The method of claim 3, wherein a corner portion of the support block, which faces the bent portion of the gas pocket part is chamfered to form a two-stage bent part, and
   in the supporting step, the gas pocket part is bent in two stages in a shape corresponding to the two-stage bent part of the support block.

5. The method of claim 1, wherein the formation step further comprises a first sealing step of sealing an edge of the battery case to seal the accommodation part and the gas pocket part, and
   the gas discharge step further comprises a piercing step of piercing the gas pocket part so that the internal gas is discharged through the gas pocket part.

6. The method of claim 1, wherein the supporting step further comprises a fixing step of closely attaching the battery case to the support block through a fixing means to fix the battery case.

7. The method of claim 6, wherein the fixing means comprises an attachment block and a tension coil spring providing tensile force that pulls the attachment block in a direction of the support block, and
   in the fixing step, the battery case is disposed between the attachment block and the support block to fix the battery case to the support block through the tensile force applied to the attachment block.

8. The method of claim 5, wherein the supporting step further comprises a vacuum fixing step of fixing an end of the gas pocket part to the support block through vacuum in the battery case.

9. The method of claim 8, wherein, in the support block, a suction hole of a vacuum tube connected to a vacuum part is provided in a top surface on which the end of the gas pocket part is seated, and
   in the vacuum fixing step, the inside of the vacuum tube is vacuumized to vacuum-suction the end of the gas pocket part through the suction hole of the vacuum tube, thereby fixing the gas pocket part.

10. The method of claim 9, wherein, in the piercing step of the gas discharge step, a portion of the gas pocket part, which faces the suction hole of the vacuum tube, is pierced through a piercing device, and
    in the gas discharge step, the body is pressed while the vacuum fixing step is performed to discharge the gas.

11. The method of claim 9, wherein the top surface of the support block supports a substantial portion of the gas pocket part.

12. The method of claim 9, wherein the top surface supports an outermost end of the gas pocket part spaced from the accommodation part.

* * * * *